(12) United States Patent
Matsumoto et al.

(10) Patent No.: US 8,327,729 B2
(45) Date of Patent: Dec. 11, 2012

(54) SHIFT DRIVE MECHANISM FOR MULTI-SPEED TRANSMISSION

(75) Inventors: Shinya Matsumoto, Wako (JP); Osamu Nishioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 425 days.

(21) Appl. No.: 12/647,136

(22) Filed: Dec. 24, 2009

(65) Prior Publication Data

US 2010/0218634 A1    Sep. 2, 2010

(30) Foreign Application Priority Data

Feb. 27, 2009  (JP) .................................. 2009-047271
Feb. 27, 2009  (JP) .................................. 2009-047274

(51) Int. Cl.
   *B60K 26/00*    (2006.01)
(52) U.S. Cl. ...................... 74/325; 74/473.24; 74/473.25
(58) Field of Classification Search .................... 74/325, 74/337.5, 473.24, 473.25
   See application file for complete search history.

(56) References Cited

U.S. PATENT DOCUMENTS

| | | | | |
|---|---|---|---|---|
| 6,564,663 B2* | 5/2003 | Rioux et al. | ................. | 74/336 R |
| 8,109,166 B2* | 2/2012 | Tsukada et al. | ................. | 74/330 |
| 2009/0038425 A1* | 2/2009 | Takeuchi | ......................... | 74/337 |
| 2009/0084210 A1* | 4/2009 | Tsukada et al. | ................. | 74/330 |
| 2009/0242345 A1* | 10/2009 | Nakagawara et al. | ....... | 192/3.58 |

FOREIGN PATENT DOCUMENTS

JP    2009-243659 A    10/2009

\* cited by examiner

*Primary Examiner* — Ha D. Ho
(74) *Attorney, Agent, or Firm* — Birch, Stewart, Kolasch & Birch, LLP

(57) ABSTRACT

A shift drive mechanism for a multi-speed transmission in which a shift rod can be stably maintained at a desired fixed position without the need for an intermittent drive mechanism and which is small in size and low in cost. The shift drive mechanism for a multi-speed transmission includes a shift guide groove G formed in a shift drum so as to guide a shift pin moved in the axial direction together with the shift rod. Each of gear speed groove portions Gs is formed at axial-direction positions determined on a gear speed basis and directing the shift pin only to the circumferential direction or not moving the shift pin in the axial direction attendant on turning of the shift drum is set to be longer than the distance the shift drum travels idly from the moment of stop of driving of a shift actuator.

20 Claims, 25 Drawing Sheets

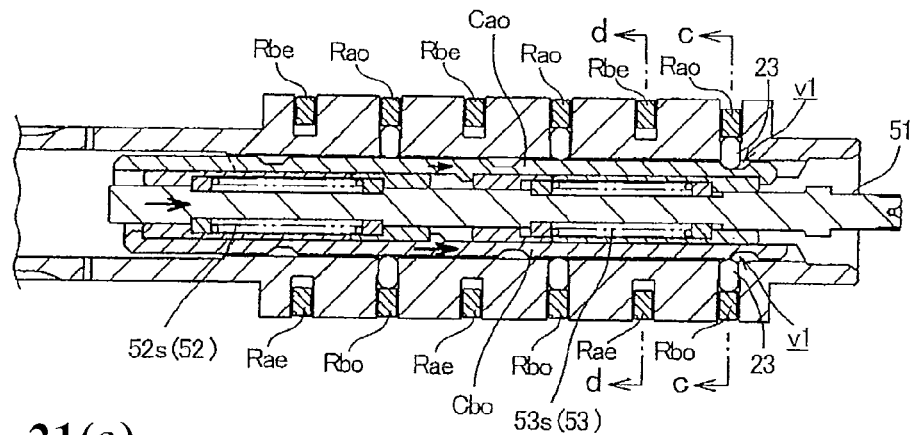
FIG. 21(a)
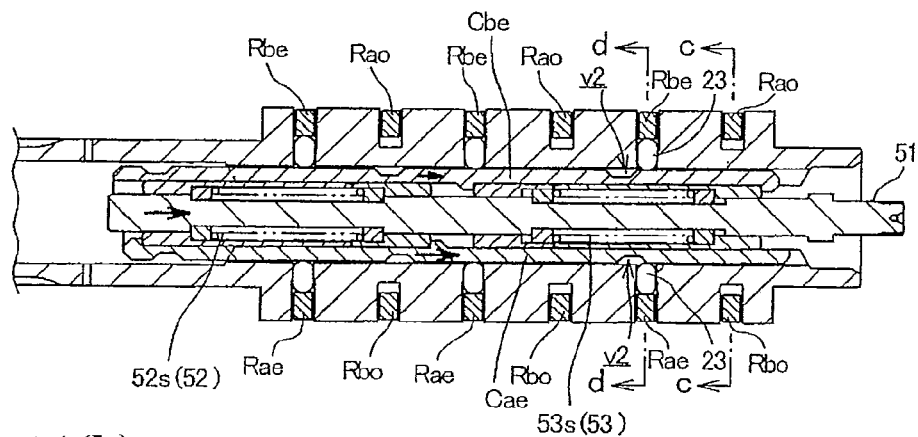
FIG. 21(b)
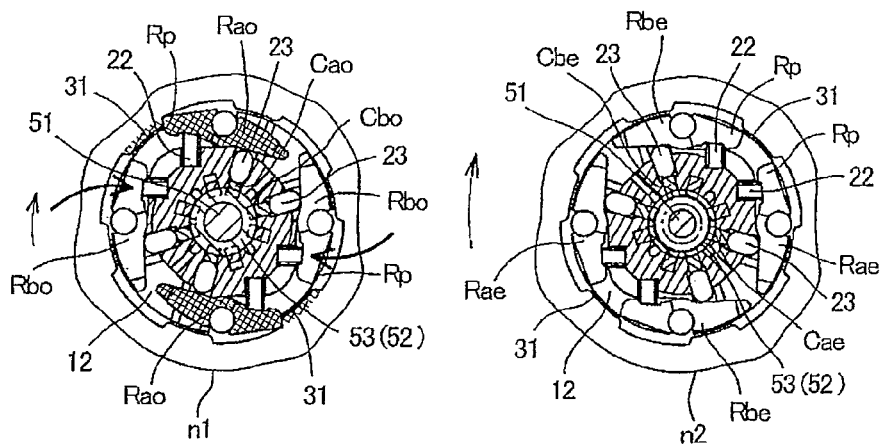
FIG. 21(c)
FIG. 21(d)

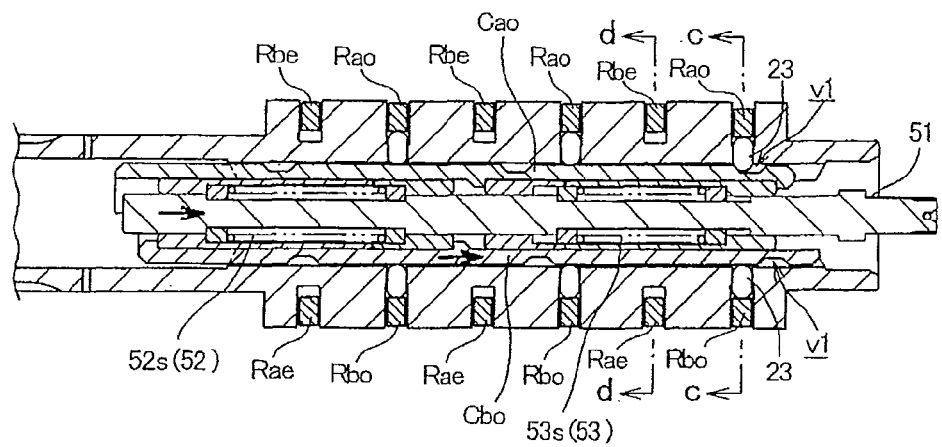
FIG. 22(a)
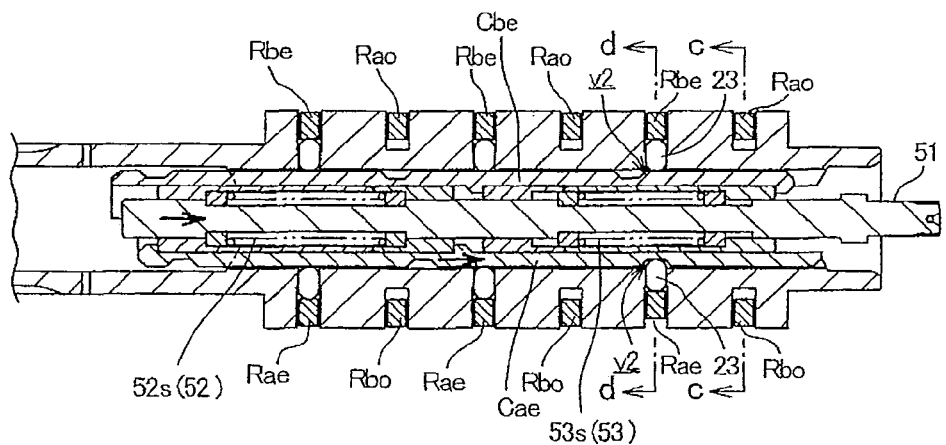
FIG. 22(b)
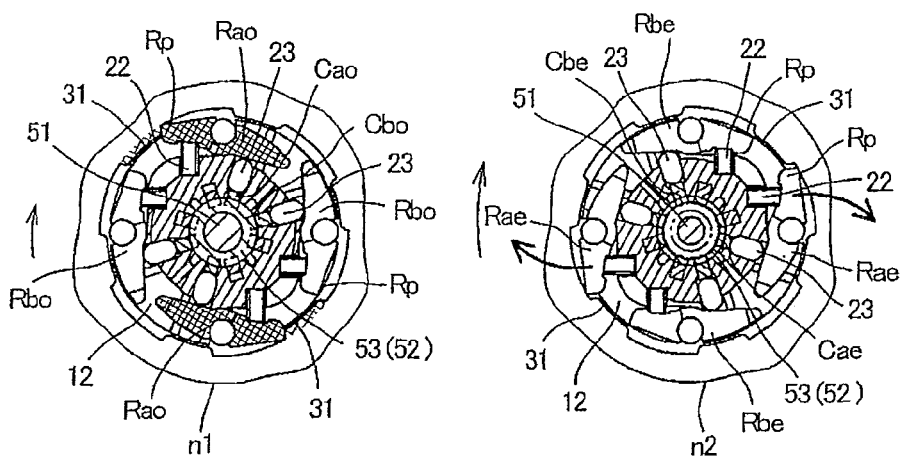
FIG. 22(c)  FIG. 22(d)

SHIFT DRIVE MECHANISM FOR MULTI-SPEED TRANSMISSION

CROSS-REFERENCE TO RELATED APPLICATIONS

The present application claims priority under 35 USC 119 to Japanese Patent Application No. 2009-047271 filed on Feb. 27, 2009 and Japanese Patent Application No. 2009-047274 filed on Feb. 27, 2009 the entire contents of which are hereby incorporated by reference.

BACKGROUND OF THE INVENTION

1. Field of the Invention

The present invention relates to a multi-speed transmission wherein a plurality of drive gears and a plurality of driven gears are supported, in the state of being in constant mesh on a gear speed basis, respectively on gear shafts parallel to each other, and particularly to a shift drive mechanism.

2. Description of Background Art

In the multi-speed transmission of the constant-mesh type, one group of gears of the drive gears and the driven gears are fixed on the gear shaft, the other group of gears are rotatably borne on the gear shaft, and one of the rotatable gears which is engaged with the gear shaft is switched over by an engagement switch-over mechanism, thereby performing a shift.

In regard of a shift drive mechanism by which an engagement switch-over mechanism for switching over engaging means provided between a plurality of gears and a gear shaft so as to make engagement therebetween is driven to perform a shift, a configuration wherein a shift rod disposed along the center axis of an inner cavity of a gear shaft moves cam rods being put in slidable contact with the inner peripheral surface of the inner cavity of the gear shaft so as to be movable in the axial direction, and the cam rods drive the engaging means so as to perform a shift. See, for example, Japanese Patent Application No. 2008-093703 previously applied by the same applicant as the applicant of the present invention.

The shift drive mechanism for a multi-speed transmission disclosed in Japanese Patent Application No. 2008-093703 has a configuration in which a shift pin is radially projectingly provided on an operating member mounted to an end portion of the shift rod through a bearing, an end portion of the shift pin is slidably engaged with a shift guide groove formed in an outer peripheral surface of a shift drum, and the shift pin is moved in the axial direction while being guided by the shift guide groove attendant on turning of the shift drum, whereby the shift rod is moved through the function of the operating member. In this configuration, a shift is performed by the above-mentioned engagement switch-over mechanism which is operated by movement of the shift rod.

The moving position of the shift rod for setting of each gear speed is a substantially fixed position, and, in order that the shift rod is stably maintained at a desired fixed position, a Geneva stop mechanism as an intermittent drive mechanism for turning the shift drum intermittently is provided in the system disclosed in Japanese Patent Application No. 2008-093703.

Since the intermittent drive mechanism which is complicated and bulky is provided at an end portion, protruding from an end portion of the driven gear shaft, of the shift rod inserted in the inner cavity of the driven gear shaft along the center axis, the multi-speed transmission as a whole is large in weight and high in cost.

SUMMARY AND OBJECTS OF THE INVENTION

The present invention has been made in consideration of these points. Accordingly, it is an object of an embodiment of the present invention to provide a shift drive mechanism for a multi-speed transmission in which a shift rod can be stably maintained at a desired fixed position by a simple turning restrictive means without a special need for an intermittent drive mechanism and which is small in size and low in cost.

In order to attain the above object, according to an embodiment of the present invention a shift drive mechanism is provided for a multi-speed transmission including a plurality of drive gears and a plurality of driven gears supported, in a state of being in constant mesh on a gear speed basis, respectively on gear shafts parallel to each other. The plurality of gears in one gear group of the drive gears and the driven gears being fixed to the gear shaft with an engagement switch-over mechanism being provided by which the engagement between the gear shaft and each gear among the plurality of gears in the other gear group is switched over on a gear basis. The engagement switch-over mechanism is driven by a shift drive mechanism so as to perform a shift, wherein the shift drive mechanism includes a shift rod inserted on the inner side of a plurality of cam rods along a center axis of an inner cavity of the gear shaft wherein the shift rod is moved in the axial direction to thereby move the cam rods. A shift pin is moved in the axial direction together with the shift rod. A shift drum includes a center axis of rotation parallel to the shift rod with the shift drum having an outer peripheral surface formed with a shift guide groove with which an end portion of the shift pin is engaged. A shift actuator is provided for turning the shift drum wherein the shift guide groove has a configuration in which gear speed groove portions are formed at axial-direction positions determined on a gear speed basis and are oriented in the circumferential direction so as not to move the shift pin in the axial direction attendant on turning of the shift drum and are sequentially connected to each other through spirally shaped shift groove portions operable to move the shift pin in the axial direction attendant on the turning of the shift drum. The gear speed groove portions are each set to be longer than a distance the shift drum travels idly from the moment of stop of driving of the shift actuator. In addition, in order for the shift guide groove to be continuously formed spirally in the outer peripheral surface of the shift drum over at least one circumference, a plurality of the gear speed groove portions overlap with each other at the same circumferential-direction position in the outer peripheral surface of the shift drum. The turning of the shift drum is restricted at a turning angle corresponding to each gear speed by turning restrictive means having a restrictive member pressed against a cam surface of a turning restrictive cam mounted to the shift drum so as to be turnable as one body with the shift drum.

According to an embodiment of the present invention, the shift guide groove is formed continuously over at least one circumference in the outer peripheral surface of the shift drum.

According to an embodiment of the present invention, the detection of a turning angle of the shift drum is conducted through a speed reduction applied to the turning of the shift drum by a speed reducing gear mechanism.

According to an embodiment of the present invention, the gear speed groove portion is set to be longer than the distance the shift drum travels idly from the moment of stop of driving of the shift actuator.

According to an embodiment of the present invention, the turning restrictive cam includes a shift cam surface pressed by the restrictive member when the shift pin is in the shift groove portion, and a gear speed cam surface pressed by the restrictive member when the shift pin is in the gear speed groove portion; the shift cam surface is formed with a high cam ridge at an intermediate portion thereof. The gear speed cam surface is formed by an arcuate surface having a predetermined outside diameter.

According to an embodiment of the present invention, the gear speed groove portions of the shift guide groove are each set to be longer than the distance the shift drum travels idly from the moment of stop of driving of the shift actuator. Therefore, while adopting a simple configuration without the need for an intermittent drive mechanism, the shift rod can be speedily and stably maintained in a desired fixed position and the setting of a gear speed can be performed securely and speedily, even if the speed of the gear shifting by the actuator is high.

According to an embodiment of the present invention, the shift guide groove is formed continuously over at least one circumference in the outer peripheral surface of the shift drum. Therefore, even the transmission having a multiplicity of gear speeds can be coped with by a single shift drum and by a shift drum having a small outside diameter. Thus, it is possible to achieve reductions in size, weight and cost of the multi-speed transmission.

According to an embodiment of the present invention, the detection of the turning angle of the shift drum is performed through speed reduction applied to the turning of the shift drum by a speed reducing gear mechanism. This makes it possible to use an inexpensive potentiometer.

According to an embodiment of the present invention, a configuration in which a plurality of the gear speed groove portions overlap with each other at the same circumferential-direction position in the outer peripheral surface of the shift drum is adopted. Thus, turning of the shift drum is restricted at a turning angle corresponding to each gear speed by the turning restrictive means. Therefore, the gear speeds can be set while stably maintaining the shift rod at a desired axial-direction position by the simple turning restrictive means without particular need for an intermittent drive mechanism, and a plurality of gear speeds can be set by a single turning state of the shift drum the turning of which is restricted by the turning restrictive means. Accordingly, it is possible to reduce the diameter of the shift drum, to simplify the turning restrictive cam, and to achieve reductions in the size, weight and cost of the shift drive mechanism and the multi-speed transmission.

According to an embodiment of the present invention, the gear speed groove portions of the shift guide groove are each set to be longer than the distance the shift drum travels idly from the moment of stop of driving of the shift actuator. Therefore, even if the driving speed of the actuator is high, the shift rod can be speedily and stably maintained in a desired axial-direction position while adopting a simple configuration without the need for an intermittent drive mechanism. Accordingly, the gear speed can be set assuredly and speedily.

According to an embodiment of the present invention, the shift cam surface of the turning restrictive cam is formed with a high cam ridge at an intermediate portion thereof, and the gear speed cam surface is formed with an arcuate surface having a predetermined outside diameter. Therefore, the restrictive member rides over the high cam ridge, whereby the gear speed is switched over assuredly. In addition, the restrictive member comes to stay on the gear speed cam surface between two high cam ridges, whereby the shift drum is securely restricted from turning. This ensures that the gear speed is maintained, without the use of a brake.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 is an exploded perspective view of a condition where the lost motion mechanisms are assembled onto the shift rod, and cam rods and the like;

FIGS. 21(a) to 21(d) illustrate one process during an up-shift operation;

FIGS. 22(a) to 22(d) illustrate the next process;

DETAILED DESCRIPTION OF THE PREFERRED EMBODIMENTS

Now, one embodiment of the present invention will be described below, based on FIGS. 1 to 27.

A multi-speed transmission 10 pertaining to the present embodiment is incorporated in an internal combustion engine mounted on a motorcycle.

Figure 1:
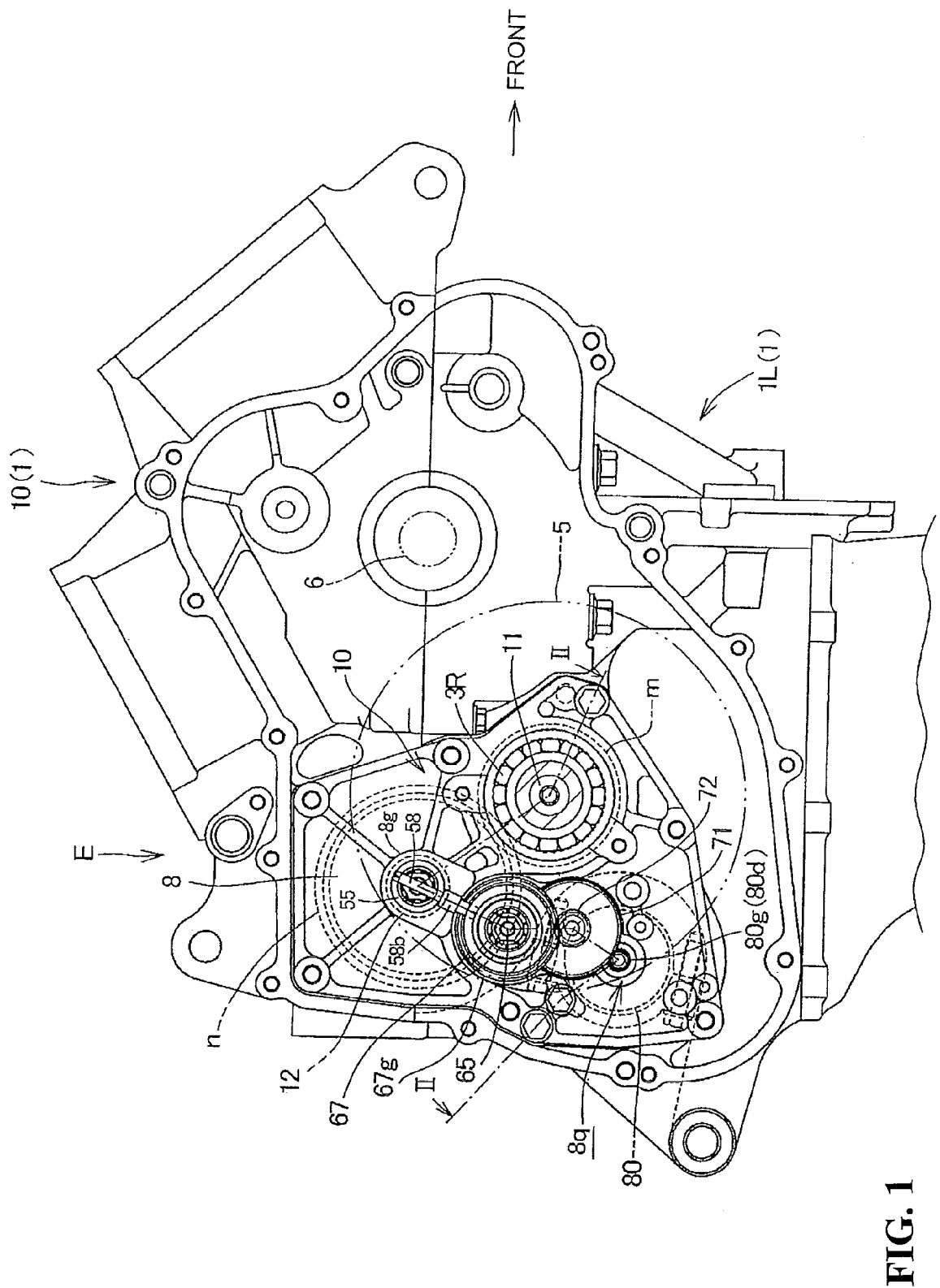
FIG. 1 is a right side view, partly omitted, of an internal combustion engine in which a multi-speed transmission according to an embodiment of the present invention is incorporated.
Figure 2:
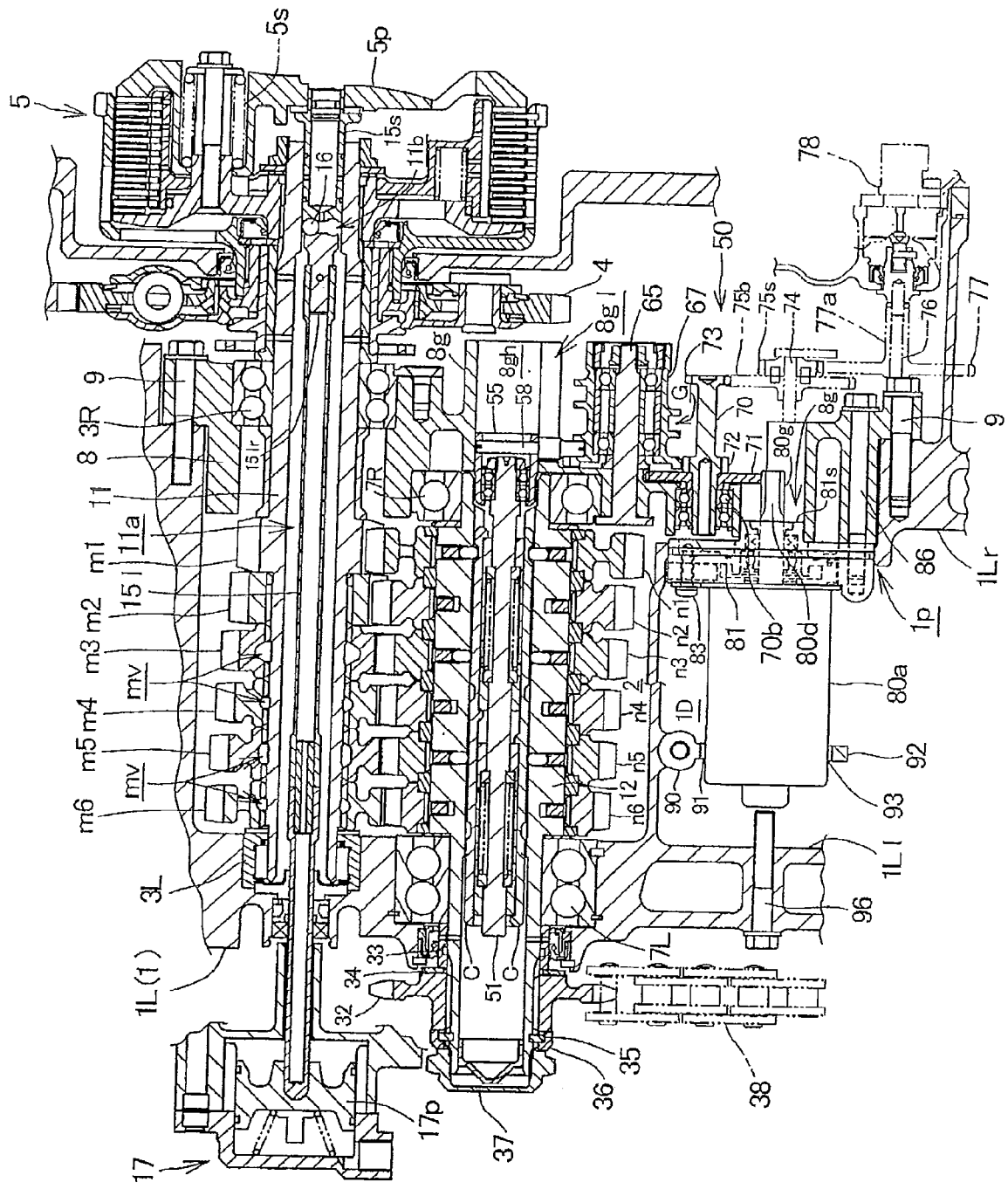
FIG. 2 is a sectional view (sectional view taken along line II-II of FIG. 1) of the multi-speed transmission.

FIG. 1 is a right side view, partly omitted, of the internal combustion engine E, and FIG. 2 is a sectional view (sectional view taken along line II-II of FIG. 1) of the multi-speed transmission 10. As shown in FIGS. 1 and 2, the multi-speed transmission 10 is provided in an engine case 1, which is used in common for the internal combustion engine as well.

Figure 3:
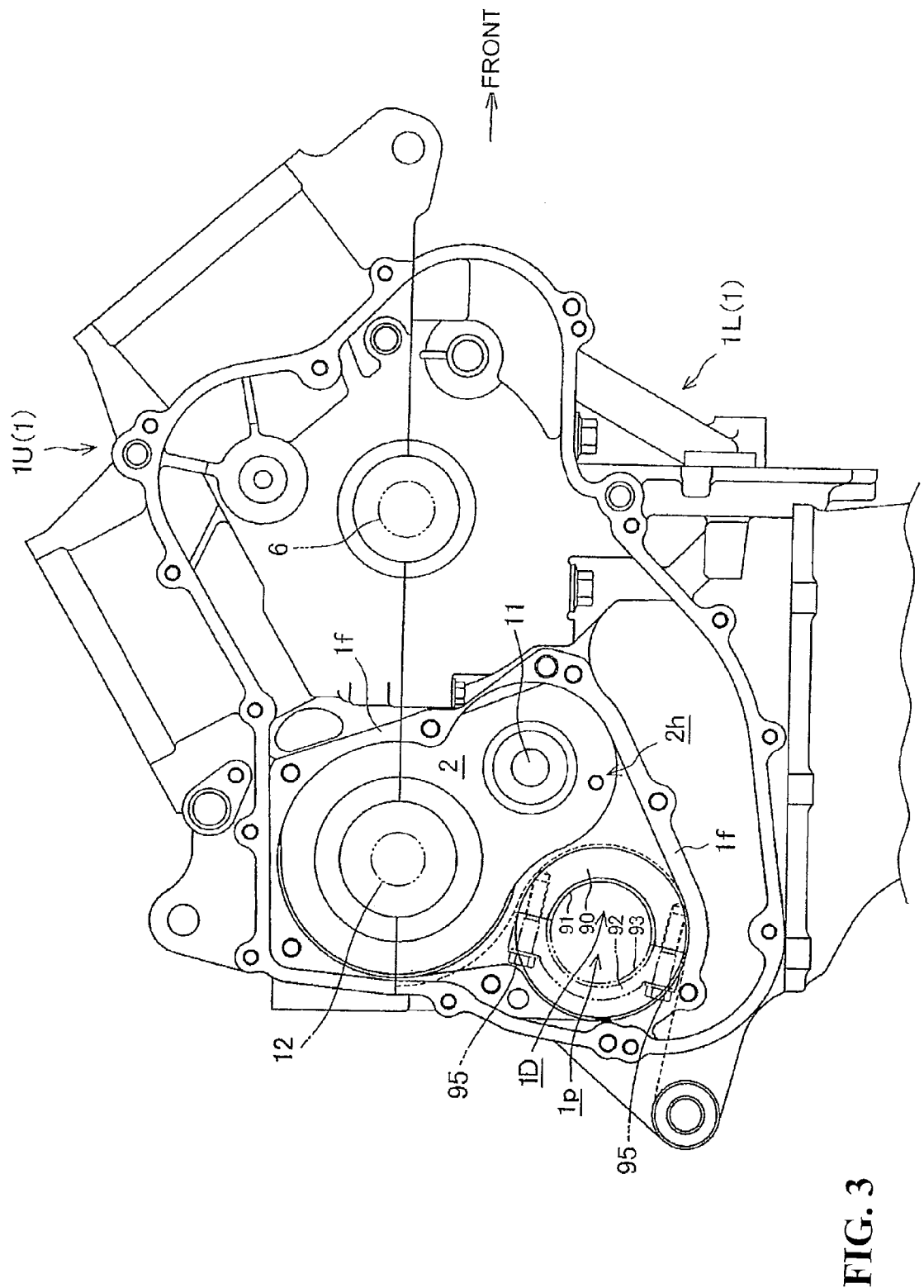
FIG. 3 is a right side view of an engine case.

As shown in FIG. 3, which is a right side view of the engine case 1, the engine case 1 is configured by uniting an upper engine case 1U and a lower engine case 1L which serve as upper and lower halves separable from each other at a boundary set at a crankshaft 6 oriented in a left-right horizontal direction. The engine case 1 is integrally formed with a transmission chamber 2. In the transmission chamber 2, a main gear shaft 11 and a counter gear shaft 12 of the multi-speed transmission 10 are rotatably borne in the state of being parallel to each other and oriented in the left-right horizontal direction.

The upper engine case 1U and the lower engine case 1L are united together while bearing, in the manner of holding from the upper and lower sides, the crankshaft 6 and the counter shaft 12 which is located at a high position in the transmission chamber 2 at the same height as the crankshaft 6.

The transmission chamber 2 is formed in a rear half portion of the united engine case 1. The engine case 1 rotatably bears left-side portions of the main gear shaft 11 and the counter gear shaft 12 in the transmission chamber 2, and is formed with a transmission chamber opening 2h opened largely on the right side. The transmission chamber opening 2h is covered with a bearing cover member 8, which rotatably bears right-side portions of the main gear shaft 11 and the counter gear shaft 12.

The main gear shaft 11 is rotatably borne on a side wall of the lower engine case 1L and the bearing cover member 8 through bearings 3L and 3R, and its right end portion penetrating the right bearing 3R and protruding from the transmission chamber 2 is provided with a multiple disc type friction clutch 5.

On the left side of the friction clutch 5, a primary driven gear 4 to which rotation of the crankshaft 6 is transmitted is rotatably borne on the main gear shaft 11.

The rotation of the crankshaft of the internal combustion engine is transmitted from the primary driven gear 4 to the main gear shaft 11 through the friction clutch 5 in an engaged state.

Referring to FIG. 2, the main gear shaft 11 has a hollow cylindrical shape, and the inner cavity includes a long large-diameter hole portion 1a having a comparatively large inside diameter and a small-diameter hole portion 11b provided on the right side and having a slightly reduced diameter. A long push rod 15l is inserted in the large-diameter hole portion 11a, and a short push rod 15s is slidably inserted in the small-diameter hole portion 11b. A right end portion 15lr of the long push rod 15l is inserted in the small-diameter hole portion 11b, and holds three balls 16 between itself and a left end portion of the short push rod 15s.

The balls 16 have such an diameter that the three balls can be disposed in the small-diameter hole portion 11b at the same position in the axial direction. Opposed end faces of the right end portion 15lr of the long push rod 15l and the left end portion of the short push rod 15s are each provided with a shallow annular groove, whereby the three balls 16 can be stably held between the end faces.

A left end portion of the long push rod 15l penetrates the lower engine case 1L to the left, to be fitted in a piston 17p of a clutch oil pressure actuator 17.

On the other hand, a right end portion of the short push rod 15s protrudes to the right from the main gear shaft 11, to be put in contact with a central portion of a pressure plate 5p of the friction clutch 5.

Therefore, when the clutch oil pressure actuator 17 is operated and the piston 17p pushes the long push rod 15l to the right, the short push rod 15s is pushed through the balls 16, to move the pressure plate 5p to the right against an elastic force of a clutch spring 5s, whereby the friction clutch 5 having been engaged by the elastic force of the clutch spring 5s can be disengaged.

The three balls 16 play the role of a thrust bearing, so that the rotation of the short push rod 15s is not transmitted to the long push rod 15l.

The main gear shaft 11 has a structure in which the large-diameter hole portion 11a having a comparatively large inside diameter is formed to be long, so that a reduction in weight can be achieved.

In addition, in the process in which the three balls 16 interposed between the long push rod 15l and the short push rod 15s are inserted into the small-diameter hole portion 11b, when the three balls 16 are put into the large-diameter hole portion 11a from the left side and the long push rod 15l is gradually inserted from the left side, the three balls 16 are gradually pushed to the right by the right end portion 15lr of the long push rod 15l and brought into the small-diameter hole portion 11b, to be pressed against the end face of the left end portion of the short push rod 15s which has been inserted from the right side.

The three balls 16 held between the right end portion 15lr of the long push rod 15l and a left end portion 15sl of the short push rod 15s, are then naturally scattered in the circumferential direction, to be accommodated in the annular grooves in the end faces, and are stably supported there. Accordingly, the assembling operation is easy to carry out.

Of the counter gear shaft 12, a left side portion is rotatably borne by a bearing 7L sandwiched between both side walls of the upper engine case 1R and the lower engine case 1L, and a right end portion is rotatably borne on the bearing cover member 8 through a bearing 7R.

The counter gear shaft 12 is a drive shaft, and an output sprocket 32 is attached to its end portion protruding to the left beyond the bearing 7L.

A chain 38 is wrapped around the output sprocket 32, and power is transmitted to the rear wheel side through the chain 38, whereby the vehicle is caused to be operated.

Figure 9:
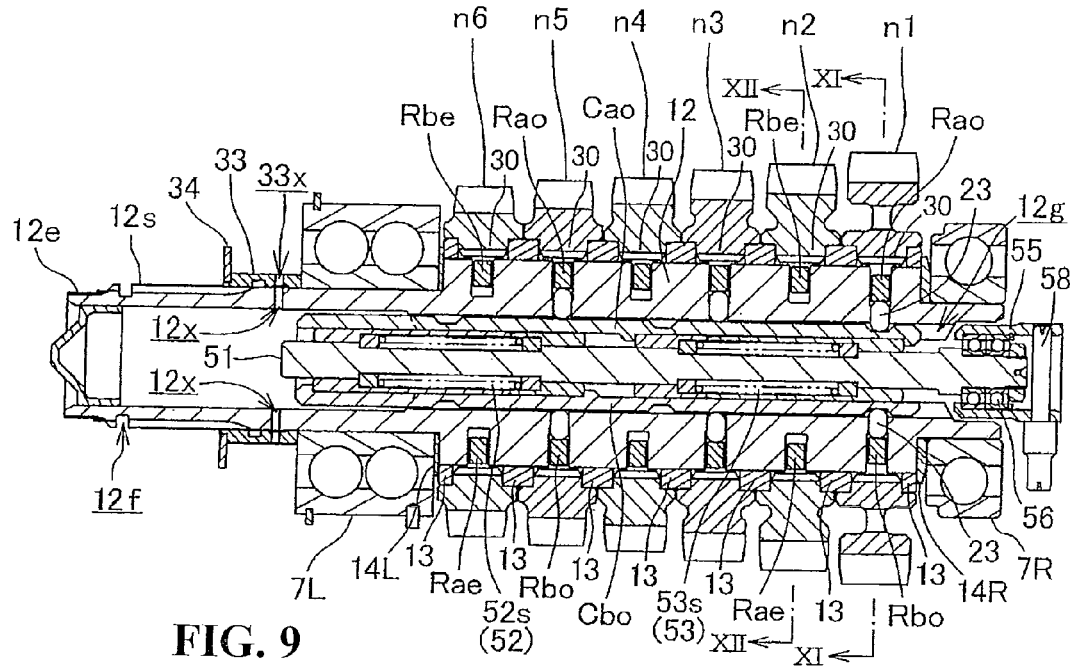
FIG. 9 is a sectional view (sectional view taken along line IX-IX of FIGS. 11 and 12) showing the structure of a counter gear shaft and the surroundings thereof.

The end portion of the counter gear shaft 12 is formed with a male screw 12e at its outermost end, and is formed with spline grooves 12s on the inner side (right side) of the male screw 12e, with an outer circumferential groove 12f formed at the boundary portion between the male screw 12e and the spline grooves 12s (see FIG. 9).

Figure 6:
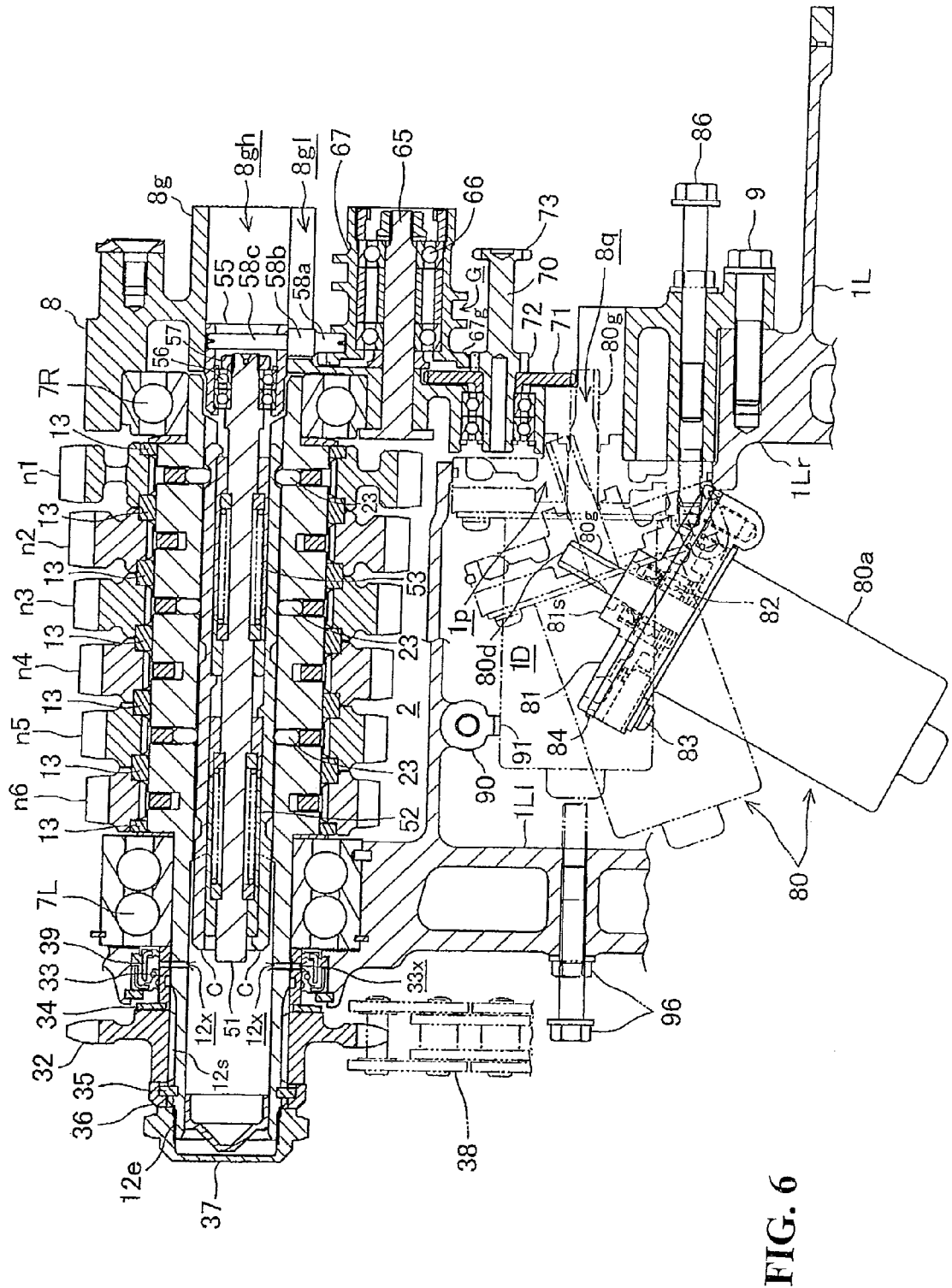
FIG. 6 is an illustration of a method for mounting a shift motor.

Referring to FIG. 6, an annular collar member 33 is externally mounted onto an end portion of the counter gear shaft 12, to make contact with an inner race of the bearing 7L. Next, a coned disc spring 34 externally mounted onto the end portion is sandwiched between the collar member 33 and the output sprocket 32 spline fitted to the spline grooves 12s. Subsequently, a half cotter 35 is fitted in the outer circumferential groove 12f, and an annular retainer 36 is externally mounted onto the half cotter 35.

The annular retainer 36 includes an outer circumferential wall and an annular side wall which respectively face an outer circumferential surface and an outer side surface of the half cotter 35. When the annular side wall of the annular retainer 36 abuts on the outer side surface of the half cotter 35, the outer circumferential wall protrudes along the outer circumferential surface of the half cotter 35 to the inner side (right side) beyond the half cotter 35, to make contact with the output sprocket 32 spline fitted to the spline grooves 12s.

A cap-shaped nut member 37 is screw engaged with the male screw 12e at the outermost end of the counter gear shaft 12, to fix the annular retainer 36 by clamping it between the nut member 37 and the half cotter 35.

Thus, the output sprocket 32 spline fitted onto the counter gear shaft 12 is constrained between the collar member 33 in abutment with the inner race of the bearing 7L and the annular retainer 36 fixed in contact with the half cotter 35, and is elastically pressed against the annular retainer 36 by the conned disc spring 34. Therefore, while the conned disc spring 34 absorbs a force component vibrating in the axial direction which is acting on the output sprocket 32, the output sprocket 32 can be constantly located within a required axial-direction range, and power is thereby transmitted to the chain 38 stably.

Between the left and right bearings 3L and 3R, a group of drive transmission gears (m) are provided on the main gear shaft 11 so that they can be rotated as one body with the main gear shaft 11.

Along the right bearing 3R, a 1st drive transmission gear m1 is formed integrally with the main gear shaft 11. The 2nd, 3rd, 4th, 5th, and 6th drive transmission gears m2, m3, m4, m5, and m6 are increased in diameter sequentially from the right side toward the left side and are spline fitted to splines formed on the main gear shaft 11 between the first drive transmission gear m1 and the left bearing 3L.

In addition, the 3rd, 4th, 5th, and 6th drive transmission gears m3, m4, m5, and m6 are formed with inner circumferential grooves my in the circumferential direction in their inner peripheral surfaces where spline fit portions are formed, whereby a reduction in weight is achieved.

On the other hand, a group of driven transmission gears (n) are rotatably borne on the counter gear shaft 12 between the left and right bearings 7L and 7R, through annular bearing collar members 13.

On the counter gear shaft 12, five bearing collar members 13 are externally mounted at regular intervals between a right-end bearing collar member 13 externally mounted through a collar member 14R disposed at the left of the right bearing 7R and a left-end bearing collar member 13 externally mounted through a collar member 14L disposed at the right of the left bearing 7L. The 1st, 2nd, 3rd, 4th, 5th, and 6th driven transmission gears n1, n2, n3, n4, n5, and n6 are decreased in diameter sequentially from the right side toward the left side and are rotatably borne on the counter gear shaft 12 in the manner of bridgingly ranging between adjacent ones (13, 13) of the total of seven bearing collar members 13.

The 1st, 2nd, 3rd, 4th, 5th, and 6th drive transmission gears m1, m2, m3, m4, m5, and m6 rotated as one body with the main gear shaft 11 are constantly meshing respectively with the corresponding 1st, 2nd, 3rd, 4th, 5th, and 6th driven transmission gears n1, n2, n3, n4, n5, and n6 rotatably borne on the counter gear shaft 12.

The meshing between the 1st drive transmission gear m1 and the 1st driven transmission gear n1 constitutes a 1st gear speed having a highest reduction gear ratio, whereas the meshing between the 6th drive transmission gear m6 and the 6th driven transmission gear n6 constitutes a 6th gear speed having a lowest reduction gear ratio, and the reduction gear ratio is sequentially decreased therebetween to constitute 2nd, 3rd, 4th, and 5th gear speeds, respectively.

Consequently, the odd-ordinal speed gears (the 1st, 3rd, and 5th driven transmission gears n1, n3, and n5) for the odd-ordinal gear speeds and the even-ordinal speed gears (the 2nd, 4th, and 6th driven transmission gears n2, n4, and n6) for the even-ordinal gear speeds are alternately arranged on the counter gear shaft 12.

The counter gear shaft 12 having a hollow tubular shape has, incorporated therein, engaging means 20 capable of engagement with each of the driven transmission gears (n), as described later. Also as described later, four kinds of a total of eight cam rods C (Cao, Cao, Cae, Cae, Cbo, Cbo, Cbe, Cbe) (two cam rods for each kind) as components of the engaging means 20 are fitted in cam guide grooves 12g (described later) formed in the inner peripheral surface of the inner cavity of the counter gear shaft 12 so as to be movable in the axial direction.

A shift rod 51, as a component of a shift drive mechanism 50 for realizing a shift by driving the cam rods C, is inserted along the center axis of the inner cavity of the counter gear shaft 12, and an axial movement of the shift rod 51 causes axial movements of the cam rods C in an interlocking manner through lost motion mechanisms 52 and 53.

A mechanism for moving the shift rod 51 in the axial direction is provided at the right engine case 1R.

The axial movement of the shift rod 51 causes the axial movements of the cam rods C in an interlocking manner through the lost motion mechanisms 52 and 53, and the movements of the cam rods C cause, through the engaging means 20 incorporated in the counter gear shaft 12, each of the driven transmission gears (n) to be selectively engaged with the counter gear shaft 12, whereby a shift is realized.

Figure 13:
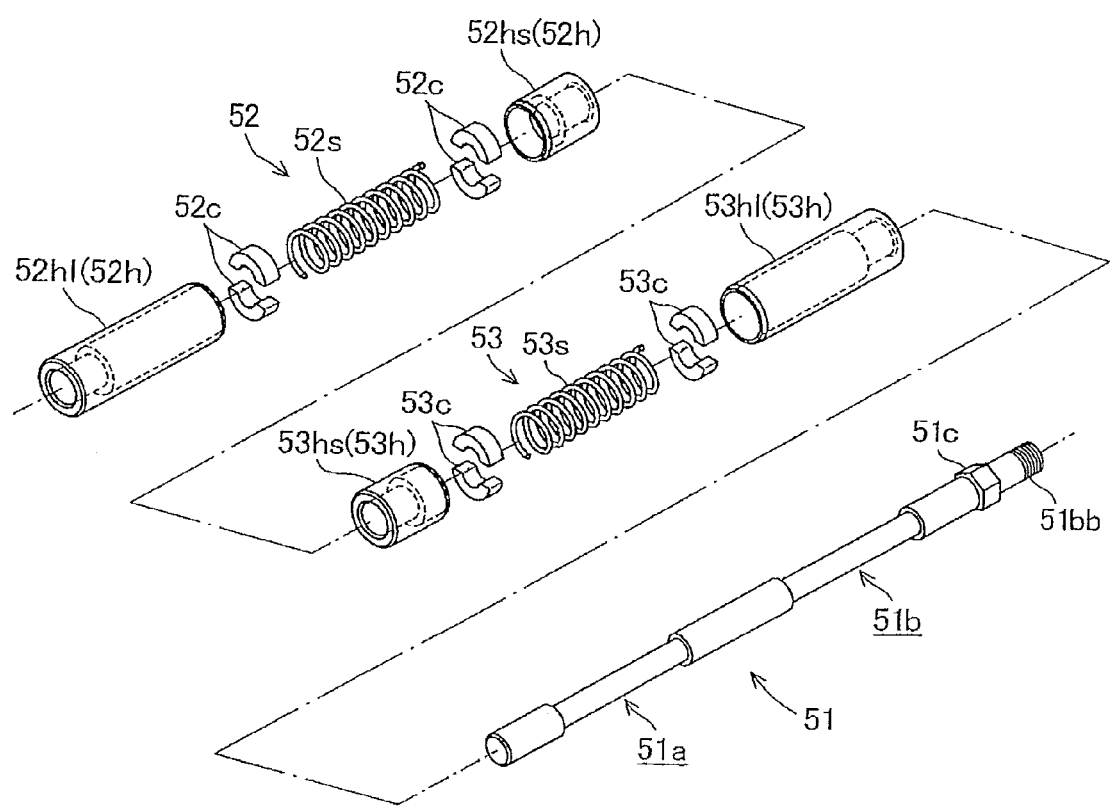
FIG. 13 is an exploded perspective view of a shift rod and lost motion mechanisms.

Referring to FIG. 13, the shift rod 51 of the shift drive mechanism 50 is in a cylindrical rod-like shape, and is provided at left and right two positions in the axial direction thereof with outer peripheral recesses 51a and 51b each of which has a reduced diameter over a predetermined length.

The right end of the shift rod 51 is a male screw end portion 51bb formed with a male screw, and a hexagonally shaped nut portion 51c is formed at the inner side (left side) of the male screw end portion 51bb.

The lost motion mechanisms 52 and 53 are mounted respectively correspondingly to the left and right outer peripheral recesses 51a and 51b of the shift rod 51.

The left and right lost motion mechanisms 52 and 53 are the same in structure, and they are so arranged as to be symmetrical with each other on the left and right sides.

The lost motion mechanism 52 on the left side has a spring holder 52h for slidably inserting the shift rod 51 therein, the spring holder 52h being composed by coupling a long holder 52hl and a short holder 52hs, and formed with an inner peripheral recess 52ha corresponding to the outer peripheral recess 51a of the shift rod 51.

When the shift rod 51 is made to penetrate the spring holder 52h and the spring holder 52h is located at the outer peripheral recess 51a of the shift rod 51, both the spaces in the inner peripheral recess 52ha of the spring holder 52h and the outer peripheral recess 51a of the shift rod 51 constitute a common space.

A left-right pair of cotters 52c, 52c serving as a spring receptacle are oppositely inserted so as to range into both the spaces in the inner peripheral recess 52ha of the spring holder 52h and the outer peripheral recess 51a of the shift rod 51, and a compression coil spring 52s wound around the shift rod 51 is interposed between the cotters 52c, 52c, to urge the cotters 52c, 52c away from each other.

In addition, the cotter 52c has a hollow circular disc-like shape having an outside diameter equal to the inside diameter of the inner peripheral recess 52ha of the spring holder 52h and an inside diameter equal to the outside diameter of the outer peripheral recess 51a of the shift rod 51, and is split into halves for assembly.

The lost motion mechanism 53 (a spring holder 53h, a long holder 53hl, a short holder 53hs, an inner peripheral recess 53ha, cotters 53c, and a compression coil spring 53s) on the right side also has the same structure as just-mentioned, and is disposed at an outer peripheral recess 51b of the shift rod 51.

Therefore, when the shift rod 51 is moved in the axial direction, the spring holders 52h and 53h are moved in the axial directions through the functions of the compression coil springs 52s and 53s in the left and right lost motion mechanisms 52 and 53.

Figure 14:
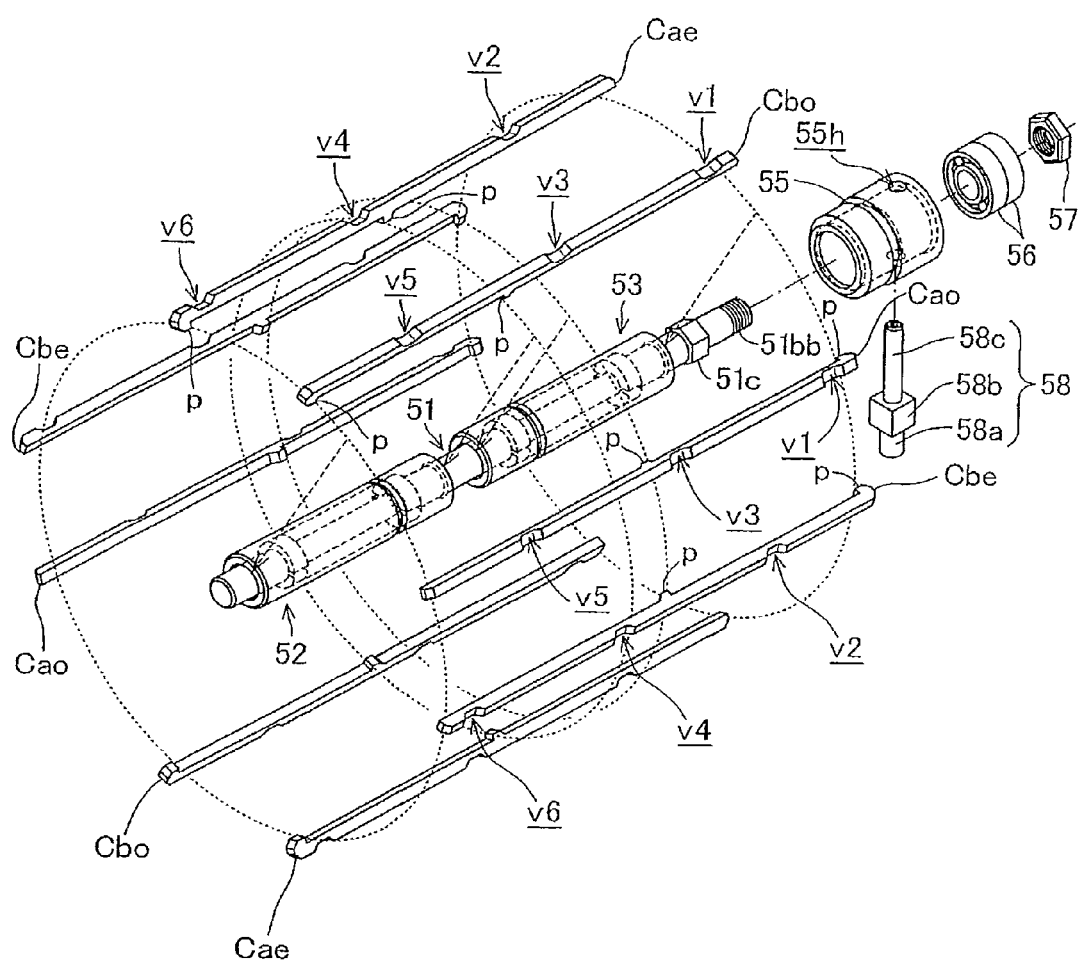

The eight cam rods C (Cao, Cao, Cae, Cae, Cbo, Cbo, Cbe, Cbe) are put, at radial positions, in contact with the outer peripheral surfaces of the spring holders 52h and 53h of the lost motion mechanisms 52 and 53 mounted to the left and right outer peripheral recesses 51a and 52b of the shift rod 51 (see FIG. 14).

The cam rod C is a prismatic rod-like member having a rectangular cross section and extending long in the axial direction. Of the cam rod C, an outer peripheral side surface on the opposite side from an inner peripheral side surface brought into contact with the spring holders 52h and 53h forms a cam surface, which is formed with cam grooves (v) at three required positions. The inner peripheral side surface is provided with a pair of lock claws (p) projecting for locking either one of the spring holders 52h and 53h in the manner of clamping it from the left and right sides.

The cam rod C is not specially shaped in cross section but has a simple rectangular prismatic rod-like general outside shape. Therefore, the cam rods C can be manufactured easily.

The odd-ordinal speed cam rods Cao and Cbo each formed with the cam grooves v1, v3, and v5 at three positions corresponding to the odd-ordinal speed gears (the 1st, 3rd, and 5th driven transmission gears n1, n3, and n5) include one kind for normal rotation (in a rotating direction such that a force is exerted from the driven transmission gear (n) to the counter gear shaft 12 at the time of acceleration) and another kind for reverse rotation (in a rotating direction such that a force is exerted from the driven transmission gear (n) to the counter gear shaft 12 at the time of deceleration). The normal-rotation odd-ordinal speed cam rod Cao on one side is provided at its inner peripheral side surface with the lock claws (p) for locking the right-side spring holder 53h, whereas the reverse-rotation odd-ordinal speed cam rod Cbo on the other side is provided at its inner peripheral side surface with lock claws (p) for locking the left-side spring holder 52h (see FIG. 14).

Similarly, the even-ordinal speed cam rods Cae and Cbe each formed with cam grooves v2, v4, and v6 at three positions corresponding to the even-ordinal speed gears (the 2nd, 4th, and 6th driven transmission gears n2, n4, and n6) include one kind for normal rotation and another kind for reverse rotation. The normal-rotation even-ordinal speed cam rod Cae on one side is provided at its inner peripheral side surface with the lock claws (p) for locking the left-side spring holder 52h, whereas the reverse-rotation even-ordinal speed cam rod Cbe on the other side is provided at its inner peripheral side surface with the lock claws (p) for locking the right-side spring holder 53h (see FIG. 14).

Therefore, with the shift rod 51 moved in the axial direction, the normal-rotation odd-ordinal speed cam rods Cao and the reverse-rotation even-ordinal speed cam rods Cbe are moved in the axial direction in an interlocking manner together with the spring holder 53h through the function of the compression coil spring 53s of the right-side lost motion mechanism 53, whereas the reverse-rotation odd-ordinal speed cam rods Cbo and the normal-rotation even-ordinal cam rods Cae are moved in the axial direction in an interlocking manner together with the spring holder 52h through the function of the coil spring 52s of the left-side lost motion mechanism 52.

As shown in FIG. 14, a hollow cylindrical shift rod operating element 55 is mounted onto a right end portion on the right side relative to the nut portion 51c of the shift rod 51, through ball bearings 56 fitted on the inside thereof.

The ball bearings 56 are two ball bearings coupled with each other in the axial direction, and are fitted onto the right end portion on the right side relative to the nut portion 51c of the shift rod 51. The ball bearings 56 are fastened in the state of being clamped between the nut portion 51c and a nut 57 screw engaged with the male screw end portion 51bb, by the nut 57.

Therefore, the shift rod operating element 55 is rotatably holding the right end portion of the shift rod 51.

A hollow cylindrical portion, extending to the right beyond the screw-engaged nut 57, of the shift rod operating element 55 is provided with pin holes 55h piercing it in a diametral direction, and a shift pin 58 is passed through the pin holes 55h.

The shift pin 58 penetrates the shift rod operating element 55 to protrude to only one side (see FIG. 2). As shown in FIG. 14, a protruding end portion of the shift pin 58 is a cylindrical engaging portion 58a for slidable engagement with a shift guide groove G of a shift drum 67 (described later), and a rectangular parallelopiped slide portion 58b is formed between a small-diameter cylindrical portion 58c, penetrating the shift rod operating element 55, and the engaging portion 58a.

Since the portion penetrating the shift rod operating element 55 is made to be the small-diameter cylindrical portion 58c smaller in diameter than the engaging portion 58a, the shift rod operating element 55 and the portion for guiding the shift rod operating element 55 can be reduced in size and weight, whereby space saving can be achieved.

Of the lower engine case 1L, a central portion in the left-right direction of a rear lower portion of an outer wall of the transmission chamber 2 is recessed to the inner side (front side), leaving both side portions as they are, to form a recess 1D for accommodating a shift motor 80 as a shift actuator. An opposed engine case outside walls 1Ll and 1Lr on both sides of the recess 1D, the right engine case outside wall 1Lr is formed with a first fitting hole 1p in which to fit an outer peripheral portion of a mounting bracket 81 of the shift motor 80.

The transmission chamber opening 2h on the right side of the transmission chamber 2 and the first fitting hole 1p are opened while fronting on the inside of a common annular frame wall 1f (see FIG. 3), and the bearing cover member 8 for covering the transmission chamber opening 2h is mounted so as to cover the annular frame wall 1f and to also cover the first fitting hole 1p simultaneously with the transmission chamber opening 2h.

In addition, the bearing cover member 8 abuts on an end face of the annular frame wall 1f at its peripheral portion, and is fastened by a bolt 9. Therefore, the bearing cover member 8 can be mounted and dismounted by removing the bolt 9.

Figure 4:
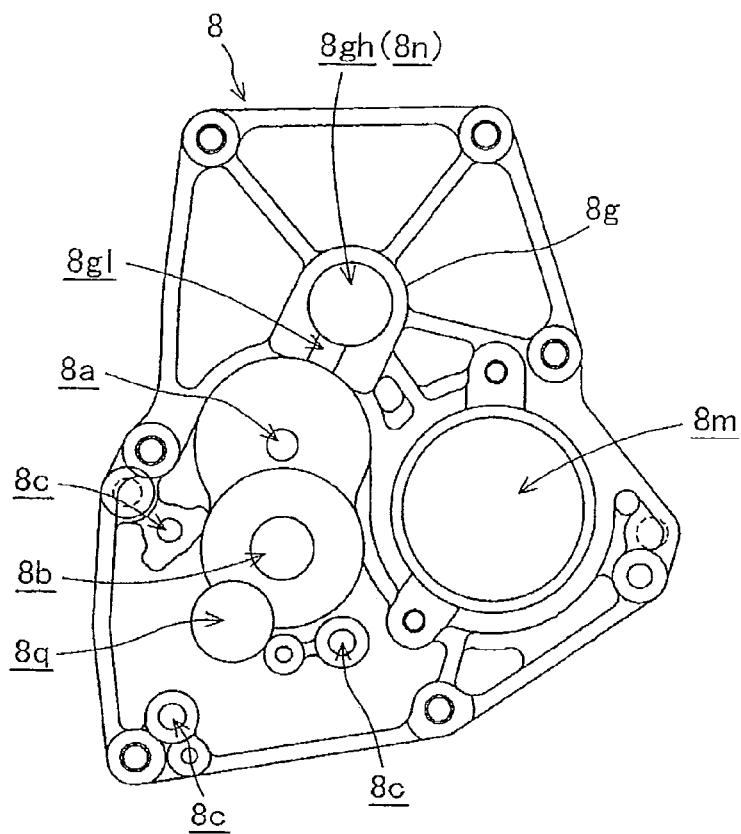
FIG. 4 is a right side view of a bearing cover member.

As shown in FIG. 4, the bearing cover member 8 includes a main bearing hole 8m in which to fit a bearing 3R for bearing the main gear shaft 11, a counter bearing hole 8n in which to fit a bearing 7R for bearing the counter gear shaft 12, the counter bearing hole 8n being on a skew upper side of the main bearing hole 8m, and a tubular guide portion 8g projected to the right coaxially with the counter bearing hole 8n.

The tubular guide portion 8g has a circular hole 8gh coaxial with the counter bearing hole 8n and small in diameter, and a lower portion thereof is cut out toward a skew lower side to form a guide slot 8gl elongated in the axial direction.

Referring to FIG. 4, a shaft hole 8a for plantingly receiving a support shaft 65 (see FIG. 2) for bearing a shift drum 67 through a bearing 66 as described later is bored on a skew lower side of the position of opening of the guide slot 8gl. A bearing hole 8b for bearing an intermediate shaft 70 through a bearing 70b (see FIG. 2) is formed on the lower side of the shaft hole 8a. Further, a second fitting hole 8q formed in a hollow cylindrical shape coaxial with a drive shaft 80d (see FIG. 2) of the shift motor 80 is formed on a skew lower side of the bearing hole 8b.

In addition, bolt holes 8c are formed at three positions on a circle in the surroundings of and concentric with the second fitting hole 8q.

The support shaft 65 is preliminarily plantedly received in the shaft hole 8a of the bearing cover member 8, and the hollow cylindrical shift drum 67 is turnably borne on the support shaft 65 through the bearing 66.

In addition, the intermediate shaft 70 is put to be turnably borne on the bearing hole 8b through the bearing 70b, a large-diameter internal gear 71 is attached to the intermediate shaft 70, and the intermediate shaft 70 is integrally formed with a small-diameter intermediate gear 72. The small-diameter gear 72 is put in mesh with a drum gear 67g formed at a side edge of the shift drum 67.

In a process in which the bearing cover member 8 in this condition is mounted so as to cover the annular frame wall 1f while covering the transmission chamber opening 2h and the first fitting hole 1p, the main gear shaft 11 is borne on the main bearing hole 8m through the bearing 3R, the counter gear shaft 12 is borne on the counter bearing hole 8n through the bearing 7R, and the shift rod operating element 55 at the right end portion of the shift rod 51 protruding to the right side beyond the counter gear shaft 12 is slidably fitted into the circular hole 8gh of the tubular guide portion 8g (see FIG. 2).

The rectangular parallelepiped slide portion 58b of the shift pin 58 penetrating the shift rod operating element 55 is slidably fitted into the guide slot 8gl of the tubular guide portion 8g, and the engaging portion 58a at the end portion of the shift pin 58 is slidably engaged with the shift guide groove G in the shift drum 67.

A shift rod moving mechanism (the shift drum 67, the shift pin 58, the shift rod operating element 55) for moving the shift rod 51 in the axial direction by the turning of the shift drum 67 and through the shift pin 58 is disposed in compact form between the friction clutch 5 at the right end of the main gear shaft 11 and the driven transmission gears (n) on the counter gear shaft 12 (see FIG. 2).

Since the slide portion 58b continuous with the engaging portion 58a of the shift pin 58 engaged with the shift guide groove G in the shift drum 67 is slidably guided in the axial direction by the guide slot 8gl in the tubular guide portion 8g, the frictional resistance generated attendant on the movement of the shift pin 58 is on the slide portion 58b in the vicinity of the engaging portion 58a on which a working force is exerted by turning of the shift drum 67. This structure ensures that the shift pin 58 is not liable to be inclined in the axial direction attendantly on its movement. Accordingly, it is possible to realize smooth axial movements of the shift pin 58 while preventing its inclination, and to achieve a smooth shift.

In addition, the prevention of the shift pin 58 from being inclined leads also to prevention of the axis of the shift rod operating element 55 from being deflected, whereby smooth movements of the shift rod 51 can be maintained, and a smoother shift can be achieved.

In addition, the prevention of falling (tilting) of the shift rod 51 by guiding the shift rod operating element 55 by the tubular guide portion 8g, also, contributes to a smooth operation of the shift rod 51.

Of the shift pin 58, the diameter of the small-diameter cylindrical portion 58c on the shift rod operating element 55 side is set to be smaller than the diameter of a portion on the shift drum 67 side. This ensures that, when the diameter of the shift pin 58 on the shift drum 67 side is reduced while maintaining the strength of the engaging portion 58a on which an operating force is exerted by turning of the shift drum 67, the shift rod operating element 55 and the tubular guide portion 8g can be reduced in size and weight. Thus, a space saving can be achieved.

The shift guide groove G in the shift drum 67 is so formed as to draw a spiral along the drum outer peripheral surface over at least two times the circumference. In the course of the shift guide groove G, the 1st-speed to 6th-speed positions are formed at an interval of a predetermined turning angle (e.g., 150 degrees).

In addition, a neutral position N is present on the lower-speed position side relative to the 1st-speed position.

Figure 7:
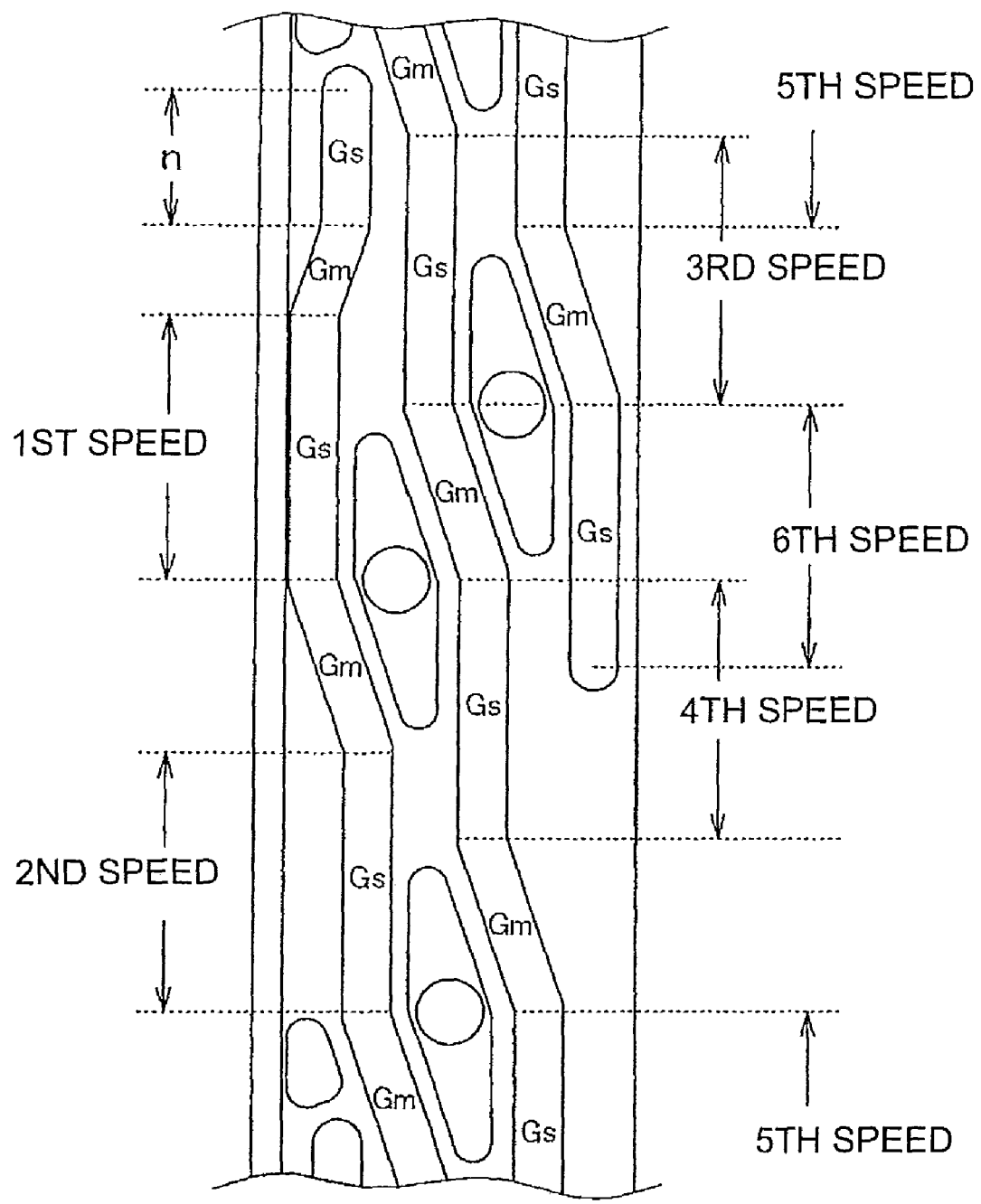
FIG. 7 is a development of an outer peripheral surface of a shift drum.
Figure 8:
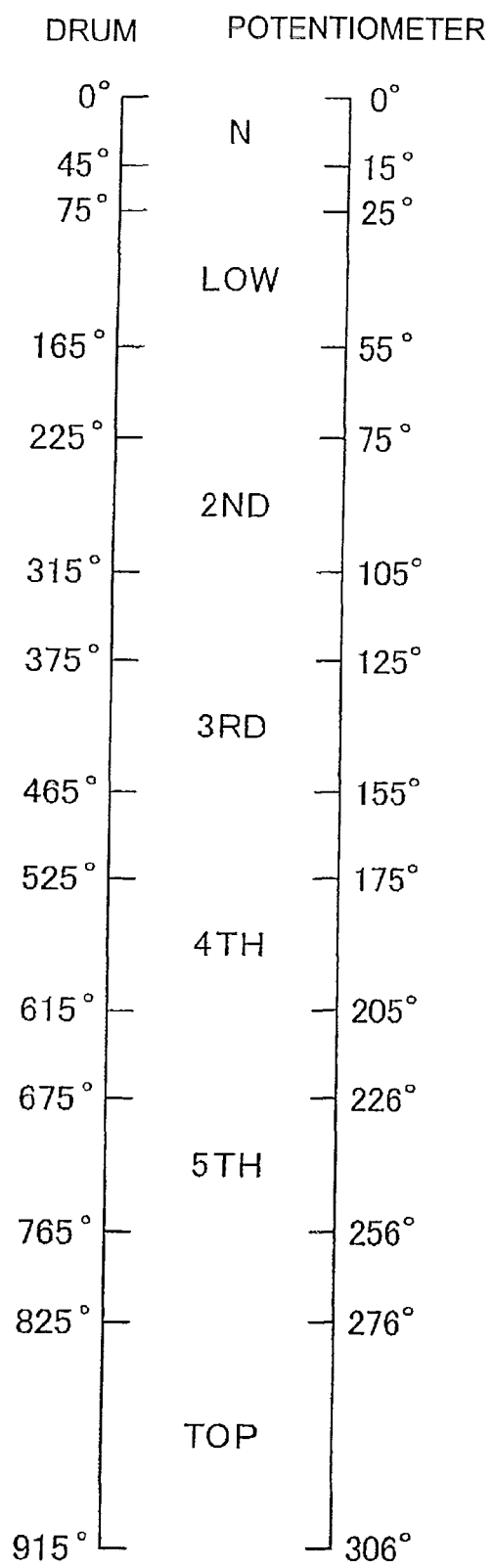
FIG. 8 is a diagram showing the relationship between turning angle of the shift drum and each gear speed and the relationship thereof with an angle detected by a potentiometer.

FIG. 7 shows a development of the outer peripheral surface of the shift drum 67, and FIG. 8 shows the positional relationship between turning angle of the shift drum 67 and the gear speed positions.

The shift guide groove G has a configuration in which gear speed groove portions Gs being formed at axial-direction positions determined on a gear speed basis and being oriented in the circumferential direction so as not to move the shift pin 58 in the axial direction attendant on turning of the shift drum 67 are sequentially connected to each other through spirally shaped shift groove portions Gm operable to move the shift pin 58 in the axial direction attendant on turning of the shift drum 67.

The present shift guide groove G has room for setting the length of each of the gear speed groove portions Gs to a greater value, notwithstanding the comparatively small outside diameter of the shift drum 67, since the shift guide groove G is formed over at least two times the circumference of the shift drum 67. As shown in FIG. 8, each of the gear speed groove portions Gs has a length, in terms of turning angle of the shift drum 67, of 90 degrees; in other words, each of the gear speed groove portions Gs is set to be longer than the distance the shift drum 67 travels idly from the moment of stop of driving of the shift motor 80.

Even when the shift motor 80 puts the shift drum 67 into a high-speed turning, setting to a desired gear speed can be easily achieved.

In other words, while adopting a simple configuration in which an intermittent drive mechanism is unnecessary, the shift rod can be speedily and stably maintained in a desired fixed position and setting of a gear speed can be performed securely and speedily, even if the speed of gear shifting by the shift motor 80 is high.

In addition, the length of each of the shift groove portions Gm in the shifting process, in terms of turning angle of the shift drum 67, is 60 degrees.

Since the shift guide groove G is formed in the outer peripheral surface of the shift drum 67 continuously over at least twice the circumference, even the multi-speed transmission 10 having a multiplicity of gear speeds as many as six gear speeds can be coped with by a single shift drum 67 and by a shift drum 67 having a small outside diameter. Thus, it is possible to achieve reductions in size, weight and cost of the multi-speed transmission 10.

In addition, the intermediate shaft 70 integrally supporting the small-diameter intermediate gear 72 in mesh with a drum gear 67g at a side edge of the shift drum 67 extends to the right, and is formed with a small-diameter gear 73 at an end portion thereof. As indicated by two-dotted chain lines in FIG. 2, a big-diameter speed reducing gear 75b rotatably borne on a support shaft 74 plantedly provided on the bearing cover member 8 is in mesh with the small-diameter gear 73 on the intermediate shaft 70, and a small-diameter speed reducing gear 75s integral with the big-diameter speed reducing gear 75b is in mesh with a large-diameter gear 77 rotatably borne on a support shaft 76 plantedly provided on the bearing cover member 8.

A hollow cylindrical base portion 77a of the large-diameter gear 77 is connected to an operating portion of a potentiometer 78 supported on the lower engine case 1L.

Therefore, the turning of the shift drum 67 is detected by the potentiometer 78 after being speed-reduced by a speed reducing gear mechanism composed of the big-diameter speed reducing gear 75b and the small-diameter speed reducing gear 75s.

FIG. 8 shows the angle detected by the potentiometer 78 in correspondence with the turning angle of the shift drum 67.

Since the potentiometer 78 detects the turning of the shift drum 67 through speed reduction by the speed reducing gear mechanism, the detected angle is about ⅓ times the turning angle of the shift drum 67, as shown in FIG. 8.

With the turning angle of the shift drum 67 thus detected through speed reduction by the speed reducing gear mechanism, an inexpensive potentiometer 78 can be used.

The shift motor 80 for turning the shift drum 67 is disposed in the recess 1D in the outer wall of the lower engine case 1L.

The drive shaft 80d protrudes from one end face of a cylindrical motor body 80a, and an end portion of the motor body 80a from which the drive shaft 80d protrudes is a mounting bracket 81.

Figure 5:
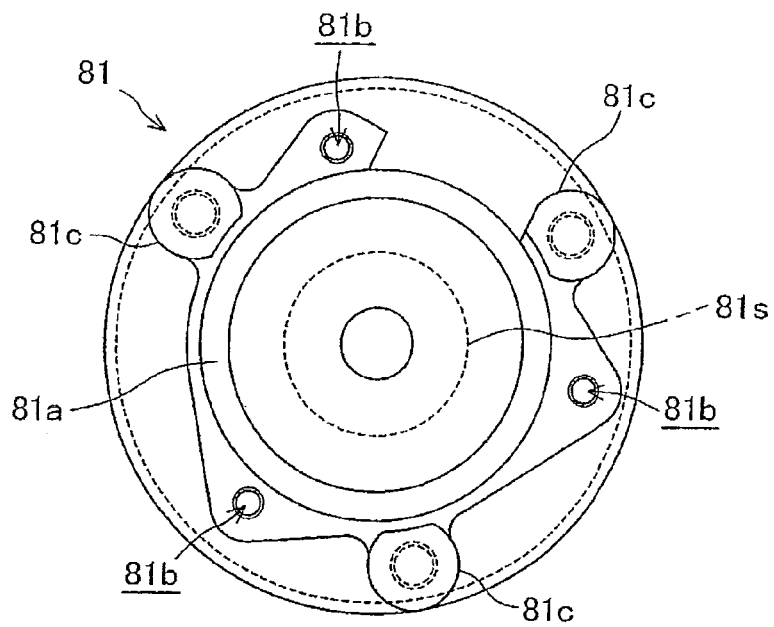
FIG. 5 is a left side view of a mounting bracket.

As shown in FIG. 5, the mounting bracket 81 is generally a circular disc-like in shape. The mounting bracket 81 is formed in its center with a bearing hollow cylindrical portion 81s for rotatably bearing the drive shaft 80d of the shift motor 80 through a bearing 82 as shown in FIG. 6, is formed therearound with an annular mounting surface 81a for the shift motor 80, and is formed therearound with motor body mounting holes 81b at three positions and with motor mounting bolt boss portions 81c at three positions.

Referring to FIG. 6, the drive shaft 80d protruding from the motor body 80a of the shift motor 80 is inserted into the bearing hollow cylindrical portion 81s of the mounting bracket 81, with the bearing 82 therebetween, an end portion of a motor body case is put in contact with the mounting surface 81a for the motor body mounting holes 81b, and bolts 83 are screw engaged with the motor body mounting holes 81b, resulting in that the mounting bracket 81 is mounted to the motor body case.

The outside diameter of the circular disc-like mounting bracket 81 is approximately equal to the inside diameter of the first fitting hole 1p in the right engine case outside wall 1Lr forming a right side surface of the recess 1D in the lower engine case 1L, and the outside diameter of the bearing hollow cylindrical portion 81s in the center of the mounting bracket 81 is approximately equal to the inside diameter of the second fitting hole 8q in the bearing cover member 8.

Referring to FIG. 6, a seal member 84 is externally fitted into an outer circumferential groove formed in an outer peripheral surface of the circular disc-like mounting bracket 81 mounted to the shift motor 80. In this condition, the mounting bracket 81 is fitted into the first fitting hole 1p in the right engine case outside wall 1Lr from the recess 1D side (left side), and, simultaneously, the bearing hollow cylindrical portion 81s is fitted into the second fitting hole 8q in the bearing cover member 8, whereby the shift motor 80 is disposed in the recess 1D in the lower engine case 1L. Fastening bolts 86 are passed through the three bolt holes 8c in the bearing cover member 8 from the right side in FIG. 6, and are screw engaged with the three motor mounting bolt boss portions 81c of the mounting bracket 81, whereby the shift motor 80 is mounted.

When the shift motor 80 is thus mounted to the right engine case outside wall 1Lr and the bearing cover member 8 by fitting its parts into the first fitting hole 1p and the second fitting hole 8q in a liquid-tight manner through the mounting bracket 81, the motor body 80a of the shift motor 80 is located in the recess 1D, and the drive gear 80g at the end portion of the drive shaft 80d protrudes to the right from the motor body 80a is put in mesh with the large-diameter gear 71 on the intermediate shaft 70.

In addition, the fitting accuracy in fitting the mounting bracket 81 into the second fitting hole 8q of the bearing hollow cylindrical portion 81s is higher than that in fitting the mounting bracket 81 into the first fitting hole 1p.

On a recessed surface of the recess 1D in the lower engine case 1L, a semicircular rib portion 90 is formed in a semicircular arcuate shape near a left engine case outside wall 1Ll forming a left side surface of the recess 1D, and a rubber member 91 is adhered to an inner peripheral surface of the semicircular rib portion 90. The motor body 80a of the shift motor 80 mounted through the mounting bracket 81 is fitted to the semicircular rib portion 90 through the rubber member 91.

Then, a semicircular support member 92 having a semicircular arcuate shape for matching to the semicircular rib portion 90 is fitted over the motor body 80a through a rubber member 93 attached to the inner circumference of the semicircular support member 92, and both ends thereof are fastened by bolts 95, whereby the motor body 80a is supported in the manner of fastening it by the semicircular rib portion 90 and the semicircular support member 92.

In addition, a fall-off preventing screw rod 96 is screw engaged with the left engine case outside wall 1Ll forming the left side surface of the recess 1D, coaxially with the drive shaft 80d of the mounted shift motor 80, from the left side so that it can be advanced and retracted.

As shown in FIG. 2, the tip of the fall-off preventing screw rod 96 is brought into proximity to an end face on the rear side (left side) of the motor body 80a by advancing the fall-off preventing screw rod 96, whereby the shift motor 80 is prevented from falling off.

In mounting the shift motor 80, the fall-off preventing screw rod 96 is set retracted, and the shift motor 80 in the condition where the semicircular support member 92 is dismounted is inserted from the rear side on which the recess 1D in the lower engine case 1L is opened. In this case, as shown in FIG. 6, a part of the outer peripheral surface of the mounting bracket 81 attached to the shift motor 80 is abutted on an opening edge of the first fitting hole 1p in the right engine case outside wall 1Lr, and the mounting bracket 81 is fitted into the first fitting hole 1p in the manner of turning the shift motor 80 substantially with the abutment point as a center of turning; simultaneously, the bearing hollow cylindrical portion 81s of the mounting bracket 81 is fitted into the second hole 8q of the bearing cover member 8.

The fitting of the outer peripheral portion of the mounting bracket 81 into the first fitting hole 1p does not require such a high fitting accuracy as that required for fitting into the second fitting hole 8q. Therefore, the fitting of the mounting bracket 81 is carried out smoothly, which facilitates the operation of mounting the shift motor 80.

Since the mounting bracket 81 is fitted into the first fitting hole 1p and the second fitting hole 8q in a liquid-tight manner, a high sealing performance is secured.

The mounting bracket 81 is firmly attached to the bearing cover member 8 by a fastening bolt 86.

In addition, the fall-off preventing screw rod 96 is advanced to bring the tip of the fall-off preventing screw rod 96 into proximity to the end face of the motor body 80a, thereby preventing the shift motor 80 from falling off. The semicircular support member 92 is fitted onto the motor body 80a fitted to the semicircular rib portion 90, and is fastened to the semicircular rib portion 90 by the bolts 95, whereby the motor body 80a is supported in a fastened manner.

When the motor body 80a of the shift motor 80 is thus accommodated in the recess 1D in the lower engine case 1L and is mounted to the lower engine case 1L, the drive gear 80g on the drive shaft 80d of the shift motor 80 is put in mesh with the large-diameter gear 71 on the intermediate shaft 70.

The shift motor 80 disposed in the recess 1D formed in a portion, on the rear lower side of an outer wall of the transmission chamber 2, of the lower engine case 1L is located on the lower side of the counter gear shaft 12 in the transmission chamber 2, and is located on the rear side of the main gear shaft 11.

More specifically, referring to FIG. 1, the counter gear shaft 12 is disposed on a skew upper side of the main gear shaft 11, and the shift motor 80 is disposed on the lower side of the counter gear shaft 12. In this structure, the shift drum 67 driven by the shift motor 80 is disposed between the shift motor 80 and the counter gear shaft 12. Therefore, the shift drum 67 and the shift motor 80 which are disposed on the lower side of the counter gear shaft 12 can be intensively arranged close to the main gear shaft 11 which is disposed on a lower front side of the counter gear shaft 12. Consequently, a compact layout structure is secured, and reductions in the sizes of the multi-speed transmission 10 and the internal combustion engine E can be achieved.

In the shift drive mechanism 50 configured as above, when the shift motor 80 is driven, the rotation of the drive shaft 80d is transmitted to turning of the shift drum 67 through the speed reducing gear mechanism including the large-diameter gear 71 and the small-diameter gear 72 which are provided on the intermediate shaft 70, whereby the shift drum 67 is sequentially turned to gear speed positions.

As has been mentioned above, the gear speed groove portions Gs of the shift guide groove G in the shift drum 67 are each set to be longer than the distance the shift drum 67 travels idly from the time of stop of driving of the shift motor 80, so that a gear speed can be set securely and speedily.

The turning of the shift drum 67 causes the shift pin 58 having the engaging portion 58a engaged with the shift guide groove G to perform parallel motion in the axial direction while being guided by the guide slot 8gl in the tubular guide portion 8g of the bearing cover member 8, whereby the shift rod 51 is moved in the axial direction through the function of the shift rod operating element 55. The movement of the shift rod 51 causes the eight cam rods Cao, Cao, Cae, Cae, Cbo, Cbo, Cbe, Cbe as components of the engaging means 20 to move in an interlocking manner through the functions of the lost motion mechanisms 52 and 53.

The shift rod 51 with the lost motion mechanisms 52 and 53 assembled thereon is inserted in the inner cavity of the counter gear shaft 12 and disposed along the center axis of the latter.

The hollow cylindrical counter gear shaft 12 has an inside diameter approximately equal to the outside diameter of the spring holders 52h and 53h of the lost motion mechanisms 52 and 53, and the spring holders 52h and 53h mounted to the shift rod 51 are slidably inserted in the counter gear shaft 12.

Figure 16:
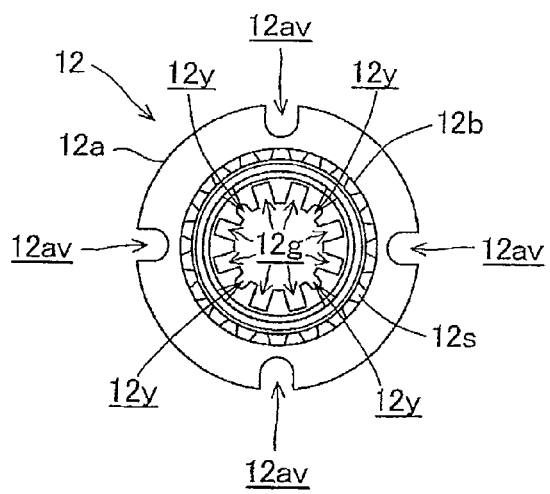
FIG. 16 is a left side view (view taken along arrow XVI of FIG. 15) of the counter gear shaft.

In addition, the eight cam guide grooves 12g rectangular in cross section are formed in the inner peripheral surface of the inner cavity of the counter gear shaft 12 at eight radial positions so as to extend in the axial direction (see FIG. 16).

The eight cam rods Cao, Cao, Cae, Cae, Cbo, Cbo, Cbe, Cbe are slidably fitted in the corresponding cam guide grooves 12g in a layout as shown in FIG. 14.

The cam rods C of the same kind are arranged at symmetrical positions.

The cam guide grooves 12g having an anti-rotation function to prevent the cam members C from rotating relative to the counter gear shaft 12 have a simple rectangular cross-sectional shape and, therefore, can be formed by easy machining.

The depth of the cam guide groove 12g is equal to the width of the cam rod C in the radial direction. Therefore, a cam surface which is an outer peripheral side surface of the cam rod C makes sliding contact with a bottom surface of the cam guide groove 12g, whereas an inner peripheral side surface of the cam rod C is substantially flush with the inner peripheral surface of the inner cavity of the counter gear shaft 12 and makes contact with the outer peripheral surfaces of the spring holders 52h and 53h, and the lock claws (p) projecting from the inner peripheral side surface of the cam rod C hold either one of the spring holders 52h and 53h in the manner of clamping it from both sides.

Figure 15:
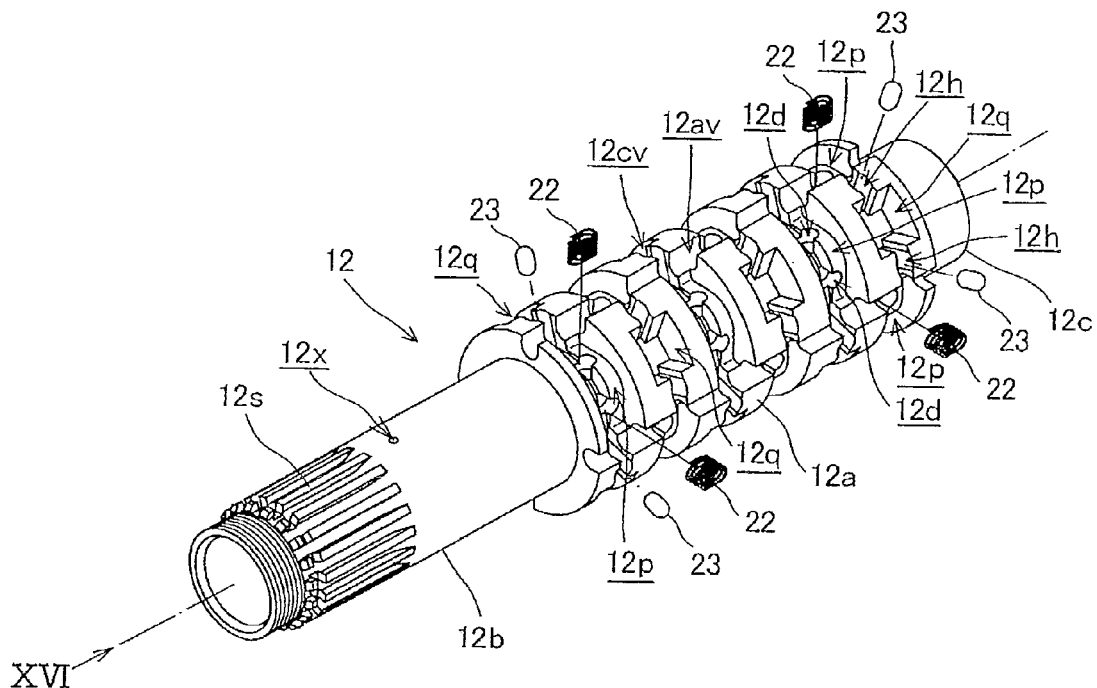
FIG. 15 is an exploded perspective view of the counter gear shaft and part of pin members and springs.

The hollow tubular counter gear shaft 12 is formed with a left-side cylindrical portion 12b and a right-side cylindrical portion 12c having a reduced outside diameter, on both left and right sides of a central hollow cylindrical portion 12a on which the driven transmission gears (n) are borne through the bearing collar members 13 (see FIG. 15).

Figure 10:
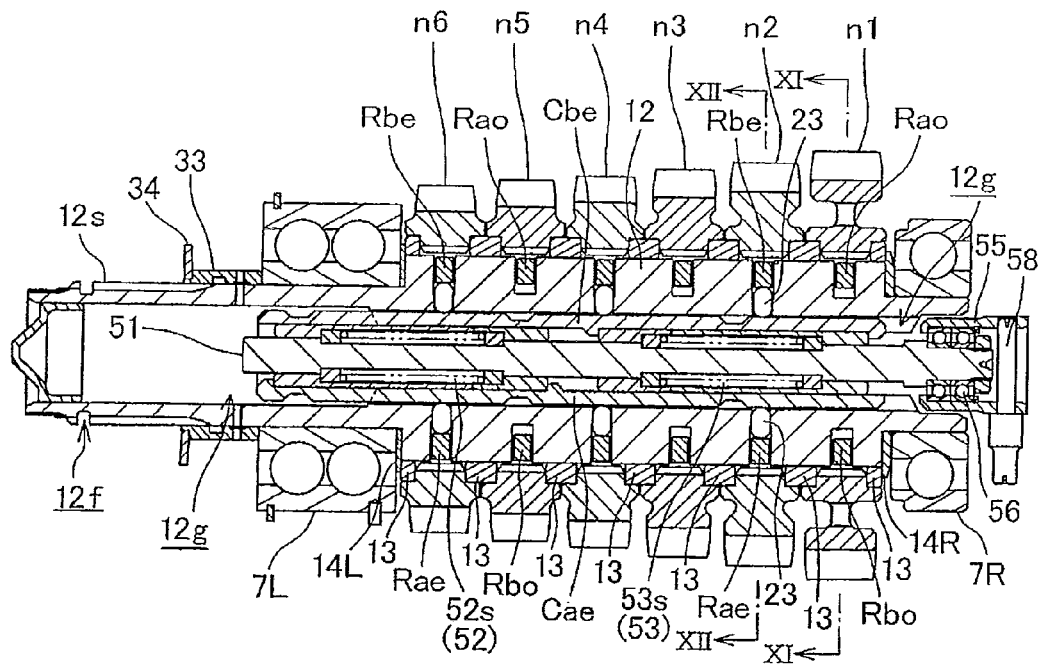
FIG. 10 is another sectional view (sectional view taken along line X-X of FIGS. 11 and 12) showing the structure of the counter gear shaft and the surroundings thereof.

The bearing 7L is fitted over the left-side cylindrical portion 12b in the state of being accompanied by a washer 14L, and the left-side cylindrical portion 12b is partly formed with the splines 12s so as to be spline fitted in the output sprocket (not shown), whereas the bearing 7R is fitted over the right-side cylindrical portion 12c in the state of being accompanied by a washer 14R (see FIGS. 2, 9 and 10).

The inner cavity of the counter gear shaft 12 is provided with a small-diameter inner peripheral surface which has an inside diameter equal to the outside diameter of the spring holders 52h and 53h and which is formed with the cam guide grooves 12g, and large-diameter inner peripheral surfaces which are formed on both sides of the small-diameter inner peripheral surface and which have an inside diameter substantially corresponding to the bottom surfaces of the cam guide grooves 12g (see FIGS. 9 and 10).

About one half of the shift rod operating element 55 is inserted in the inside of the enlarged-inside-diameter portion on the right side.

When the shift rod 51 and the lost motion mechanisms 52 and 53 as well as the eight cam rods Cao, Cao, Cae, Cae, Cbo, Cbo, Cbe, Cbe are assembled in the inner cavity of the counter gear shaft 12, all of these are rotated together. When the shift rod 51 is moved in the axial direction, the reverse-rotation odd-ordinal speed cam rods Cbo and the normal-rotation even-ordinal speed cam rods Cae are moved in the axial direction in an interlocking manner through the function of the coil spring 52s of the left-side lost motion mechanism 52, and the normal-rotation odd-ordinal speed cam rods Cao and the reverse-rotation even-ordinal speed cam rods Cbe are moved in the axial direction in an interlocking manner through the function of the coil spring 53s of the right-side lost motion mechanism 53.

The lost motion mechanisms 52 and 53 are interposed between the outer peripheral surface of the shift rod 51 and the inner side surfaces of the plurality of cam rods C, in the state of being aligned along the axial direction of the counter gear shaft 12. Therefore, the shift rod 51 and the lost motion mechanisms 52 and 53 as well as the cam rods C are overlapping in the radial directions in the inner cavity of the counter gear shaft 12. This structure makes it possible to prevent the multi-speed transmission 10 from being enlarged in the axial direction, to accommodate the lost motion mechanisms 52 and 53 in a compact form in the inner cavity of the counter gear shaft 12, and to achieve a reduction in the size of the multi-speed transmission 10 itself.

The two lost motion mechanisms 52 and 53 are provided on the shift rod 51 in the state of being aligned in the axial direction, and the lost motion mechanisms 52 and 53 move the different cam rods C respectively. Therefore, it is possible to put the plurality of cam rods C into two kinds of different movements in response to a movement of the single shift rod 51, and thereby to achieve a smoother shift. In addition, by making the lost motion mechanisms 52 and 53 symmetrical in structure, it is possible to reduce the manufacturing cost thereof and to facilitate parts management at the time of assembly.

The lost motion mechanisms 52, 53 have the coil springs 52s, 53s intermediately disposed in the spaces defined by the inner peripheral recesses 52ha, 53ha of the spring holders 52h, 53h (which are interposed between the outer peripheral surface of the shift rod 51 and the inner side surfaces of the plurality of cam rods C) and the outer peripheral recesses 51a, 51b of the shift rod 51. Therefore, the lost motion mechanisms 52 and 53 which are the same in shape can be configured on the shift rod 51.

The central hollow cylindrical portion 12a, on which the driven transmission gears (n) are rotatably borne through the bearing collar member 13, of the counter gear shaft 12 has a large outside diameter and is large in material thickness, as shown in FIG. 15. The outer peripheral portion of the thick portion is formed with six small-width circumferential grooves 12cv along the circumferential direction which correspond respectively to the 1st, 2nd, 3rd, 4th, 5th, and 6th driven transmission gears n1, n2, n3, n4, n5, and n6 and located at regular intervals along the axial direction, and four axial grooves 12av which are oriented in the axial direction and located at regular intervals along the circumferential direction.

Further, the outer peripheral portion of the central hollow cylindrical portion 12a of the counter gear shaft 12 has a structure in which each of the four segments demarcated by the four axial grooves 12av is provided with long rectangular recesses 12p and short rectangular recesses 12q arranged alternately in the axial direction. Here, the long rectangular recess 12p is a portion where the groove width of the circumferential groove 12cv is enlarged evenly on the left and right sides over a long range (over the whole distance) between the adjacent axial grooves 12av, 12av, whereas the short rectangular recess 12q is a portion where the groove width of the circumferential groove 12cv is enlarged evenly on the left and right sides over a short range (over part of the distance) between the adjacent axial grooves 12av, 12av.

At two positions spaced along the circumferential direction of the bottom surface of the long rectangular recess 12p, spring receiving portions 12d, 12d having a long elliptic shape in the axial direction and a little recessed ranging over the circumferential groove 12cv are formed.

In addition, on the circumferential groove 12cv at the thick portion between the short rectangular recess 12q and the axial groove 12av, a pin hole 12h is bored in the radial direction up to the above-mentioned cam guide groove 12g.

More specifically, from the inner peripheral surface of the inner cavity of the counter gear shaft 12, the pin holes 12h are bored in the radial directions of the cam guide grooves 12g formed by cutting at the eight positions spaced along the circumferential direction.

The pin holes 12h are formed at four positions respectively on each of the circumferential grooves 12cv.

At the spring receiving portion 12d, a compression spring 22 wound in an elliptic shape is disposed with its end portion fitted to the spring receiving portion 12d.

Pin members 23 are slidably fitted in the pin holes 12h.

In addition, the width of the cam guide grooves 12g in communication with the pin holes 12h is smaller than the outside diameter width of the pin members 23.

Therefore, the pin members 23 advanced and retracted in the pin holes 12h would not fall off into the cam guide grooves 12g, so that assembling of the engaging means 20 onto the counter gear shaft 12 is facilitated.

Since the cam rods C are slidably fitted in the cam guide grooves 12g, central-side end portions of the pin members 23 fitted in the pin holes 12h make contact with the cam surfaces of the corresponding cam rods C. When a cam groove (v) comes to correspond to the pin hole 12h upon a movement of the cam rod C, the pin member 23 falls into the cam groove (v), whereas the pin members to which other sliding contact surfaces than the cam grooves (v) correspond ride onto the sliding contact surfaces. Thus, the pin members 23 are advanced or retracted upon the movements of the cam rods C.

The advance/retraction of the pin members 23 in the pin holes 12h causes their centrifugal-side end portions to advance outward from or retract relative to the bottom surfaces of the circumferential grooves 12cv.

Swing claw members R are embedded in the long rectangular recesses 12p and the short rectangular recesses 12q as well as the circumferential grooves 12cv (communicating with both the recesses) formed in the outer peripheral portion of the central hollow cylindrical portion 12a of the counter gear shaft 12 having the above-mentioned structure. In addition, pivot pins 26 for swingably bearing the swing claw members R thereon are embedded in the axial grooves 12av.

Figure 18:
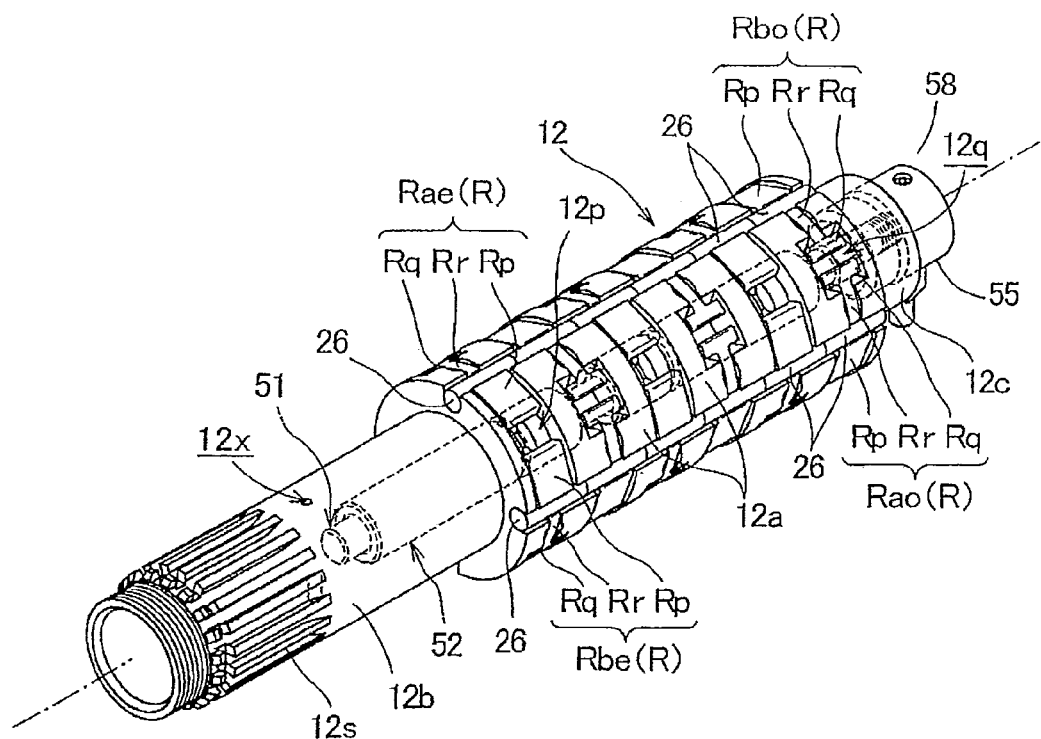
FIG. 18 is a perspective view showing a condition where part of a shift drive mechanism and engaging means are mounted to the counter gear shaft.

A condition where all the swing claw members R have been assembled in position in this manner is shown in FIG. 18.

Figure 17:
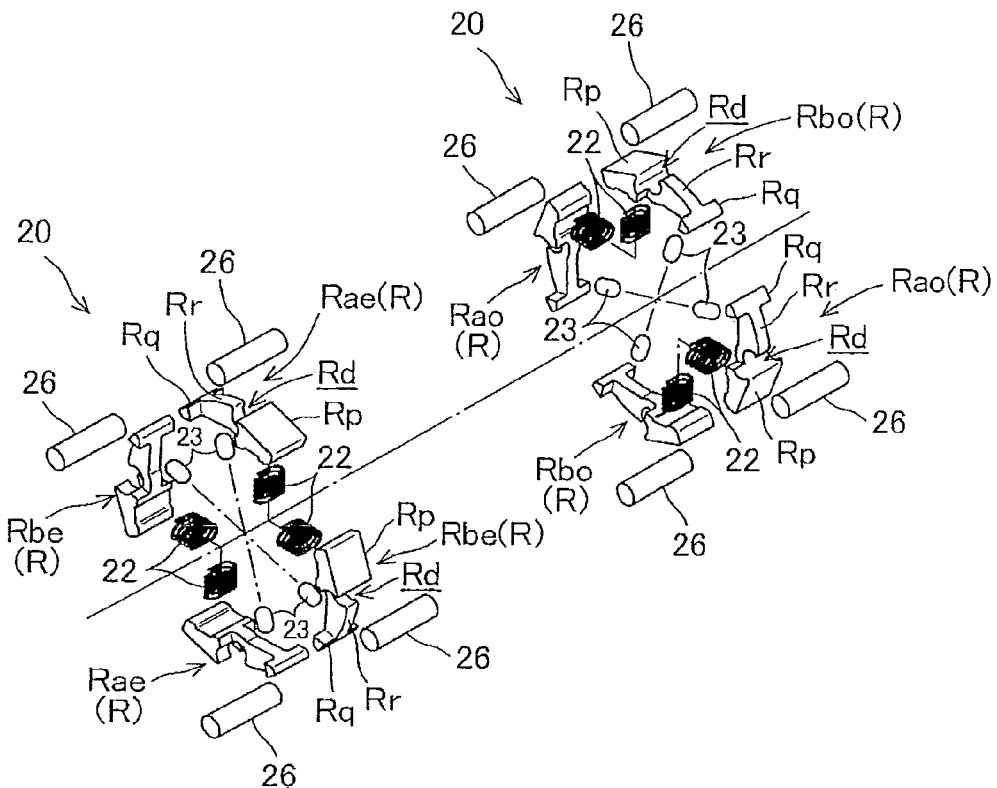
FIG. 17 is an exploded perspective view of swing claw members, pivot pins, the pin members, and the springs.

An exploded perspective view in FIG. 17 illustrates the four swing claw members R to be embedded in the circumferential grooves 12cv, the long rectangular recesses 12p, and the short rectangular recesses 12q in correspondence with the odd-ordinal speed gears (the 1st, 3rd, and 5th driven transmission gears n1, n3, and n5) and the four swing claw members R to be embedded in the circumferential grooves 12cv, the long rectangular recesses 12p, and the short rectangular recesses 12q in correspondence with the even-ordinal speed gears (the 2nd, 4th, and 6th driven transmission gears n2, n4, and n6), in postures such that the relative angular positional relationships of them are maintained. In addition, the pivot pins 26 for swingably bearing the swing claw members R thereon and the compression springs 22 acting on the swing claw members R are also shown in FIG. 17 together with the pin members 23.

All the swing claw members R used here are the same in shape. More specifically, they are substantially arcuate in shape when viewed in the axial direction. The swing claw member R is provided in its center with a bearing recess Rd formed by cutting away an outer peripheral portion of a through-hole through which to pass the pivot pin 26. An engaging claw portion Rp which has a large-width rectangular shape and which is swingably fitted in the long rectangular recess 12p is formed on one side, with respect to the center of swinging, of the bearing recess Rd. A pin receiving portion Rr which is small in width and which is swingably fitted in the circumferential groove 12cv formed with the pin hole 12h extends on the other side. An end portion of the pin receiving portion Rr reaches the short rectangular recess 12q, where it is enlarged in width to form a large-width end portion Rq.

Of the swing claw member R, the pin receiving portion Rr is fitted in the circumferential groove 12cv formed with the pin hole 12h, the engaging claw portion Rp on one side is fitted in the long rectangular recess 12p, with the bearing recess Rd matched to the axial groove 12av, and the large-width end portion Rq on the other side is fitted in the short rectangular recess 12q.

Then, the pivot pin 26 is fitted in the bearing recess Rd and the axial groove 12av thus matched to each other.

The swing claw member R is formed to be symmetrical on the left and right side about the circumferential groove 12cv in which it is fitted. The large-width rectangular engaging claw portion Rp on one side is heavier than the pin receiving portion Rr and the large-width end portion Rq on the other side. Therefore, when the swing claw member R borne on the pivot pin 26 is rotated together with the counter gear shaft 12, the engaging claw portion Rp acts as a weight in relation to a centrifugal force, thereby swinging the swing claw member R in the manner of projecting in the centrifugal direction.

The swing claw member R is so shaped that its pin receiving portion Rr is smaller in width than the engaging claw portion Rp on the opposite side of the center of swinging.

In addition, it suffices for the pin receiving portion Rr to have a width necessary to receive the pin member 23. Therefore, the swing claw member R can be made to be small in size. In addition, swinging of the swing claw member R under a centrifugal force generated by the engaging claw portion Rp on the other side is facilitated.

The swing claw members R adjacent to each other in the circumferential direction are assembled on the counter gear shaft 12 in mutually symmetric posture. Therefore, the engaging claw portions Rp, Rp opposed to each other through a predetermined spacing therebetween are fitted in a common long rectangular recess 12p, whereas the large-width end portions Rq on the other sides which are proximate to those of further adjacent swing claw members are each fitted in a common short rectangular recess 12q.

On the inner side of the engaging claw member Rp of the swing claw member R, the compression spring 22 supported at its one end by the spring receiving portion 12d of the counter gear shaft 12 is intermediately disposed. In addition, on the inner side of the pin receiving portion Rr, the pin member 23 fitted in the pin hole 12h is interposed between the pin receiving portion Rr and the cam rod C.

In this manner, the swing claw member R is swingably borne on the pivot pin 26 and embedded in the long rectangular recess 12p, the short rectangular recess 12q and the circumferential groove 12cv of the counter gear shaft 12, the engaging claw portion Rp on one side is urged outwards by the compression spring 22, and the pin receiving member Rr on the other side is pushed or not pushed by the pin member 23 made to advance or retract, whereby the swing claw member R is swung against the urging force of the compression spring 22.

When the pin member 23 is advanced in the centrifugal direction to swing the swing claw member R, the engaging claw portion Rp of the swing claw member R sinks inside the long rectangular recess 12p, so that no part of the swing claw member R protrudes outwards beyond the outer peripheral surface of the central hollow cylindrical portion 12a of the counter gear shaft 12.

On the other hand, when the pin member 23 is retracted, the engaging claw portion Rp urged by the compression spring 22 is made to protrude outwards beyond the outer peripheral surface of the central hollow cylindrical portion 12a of the counter gear shaft 12, to enable engagement with the driven transmission gear (n).

The compression springs 22 are interposed between the inner side surfaces of the engaging claw portions Rp of the swing claw members R and the long rectangular recesses 12p in the counter gear shaft 12 opposed thereto. Therefore, there is no need for exclusive-use spaces for springs in the axial direction. Thus, it is possible to prevent the counter gear shaft 12 from being enlarged in the axial direction. In addition, by disposing the compression springs 22 at the centers of the width in the axial direction of the swing claw members R, the swing claw members R themselves can be formed to be symmetrical on both sides in the axial direction. Therefore, the two kinds of the swing claw members which are engaged and disengaged in both directions of relative rotation between the driven transmission gears (n) and the counter gear shaft 12 can be the swing claw members R having the same shape, so that it is unnecessary to prepare swing claw members which are different in shape.

The compression springs 22 have an elliptic shape having a major diameter in the axial direction of the counter gear shaft 12. The compression spring 22 having an elliptic shape has a major diameter larger than the width of the pin receiving portion Rr of the swing claw member R, and is received astride the circumferential groove 12cv formed over one circumference in the circumferential direction in which the pin receiving portion Rr is swingably fitted. Therefore, machining of the counter gear shaft 12 can be facilitated, and the swing claw members R can be stably assembled onto the counter gear shaft 12.

The four swing claw members R corresponding to odd-ordinal speed gears (the 1st, 3rd, and 5th driven transmission gears n1, n3, and n5) and the four swing claw members R corresponding to the even-ordinal speed gears (the 2nd, 4th, and 6th driven transmission gears n2, n4, and n6) are in relative angular positions of 90° rotation from each other around the center axis.

Among the four swing claw members R corresponding to the odd-ordinal speed gears (the 1st, 3rd, and 5th driven transmission gears n1, n3, and n5), the normal-rotation odd-ordinal speed swing claw members Rao for such an engagement that each of the odd-ordinal speed driven transmission gears n1, n3, and n5 and the counter gear shaft 12 are rotated synchronously through abutment in the normal rotation direction of the gears and the reverse-rotation odd-ordinal speed engaging members Rbo for such an engagement that each of the odd-ordinal driven transmission gears n1, n3, and n5 and the counter gear shaft 12 are rotated synchronously through abutment in the reverse rotation direction of the gears are provided in respective pairs, the two members in each pair being located symmetrically.

Similarly, among the four swing claw members R corresponding to the even-ordinal speed gears (the 2nd, 4th, and 6th driven transmission gears n2, n4, and n6), the normal-rotation even-ordinal swing claw members Rae for such an engagement that each of the even-ordinal speed driven transmission gears n2, n4, and n6 and the counter gear shaft 12 are rotated synchronously through abutment in the normal rotation direction of the gears and the reverse-rotation even-ordinal speed engaging members Rbe for such an engagement that each of the even-ordinal speed driven transmission gears n2, n4, and n6 and the counter gear shaft 12 are rotated synchronously through abutment in the reverse rotation direction of the gears are provided in respective pairs, the two members in each pair being located symmetrically.

The normal-rotation odd-ordinal speed swing claw members Rao are each swung by the pin member 23 which is advanced and retracted by the movements of the normal-rotation odd-ordinal speed cam rod Cao, whereas the reverse-rotation odd-ordinal speed engaging members Rbo are each swung by the pin member 23 which is advanced and retracted by the movements of the reverse-rotation odd-ordinal speed cam rod Cbo.

Similarly, the normal-rotation even-ordinal speed swing claw members Rae are each swung by the pin member 23 which is advanced and retracted by the movements of the normal-rotation even-ordinal speed cam rod Cae, whereas the reverse-rotation even-ordinal speed engaging members Rbe are each swung by the pin member 23 which is advanced and retracted by the movements of the reverse-rotation even-ordinal speed cam rod Cbe.

In assembling the engaging means 20 onto the counter gear shaft 12, first, the bearing collar member 13 at the right end is externally mounted to an outer peripheral end portion of the central hollow cylindrical portion 12a, and the engaging means 20 at the right end is assembled in the manner of fitting one-side ends of the pivot pins 26 into the axial grooves 12av on the inner side of the bearing collar member 13. The next bearing collar member 13 is externally mounted so as to cover the other-side ends of the pivot pins 26, the driven transmission gear (n) is assembled, and thereafter the engaging means 20 at the next stage is assembled in the same manner as the preceding stage. Such a procedure is repeated, and, finally, the bearing collar member 13 at the left end is externally mounted, to complete the assembly.

Figure 19:
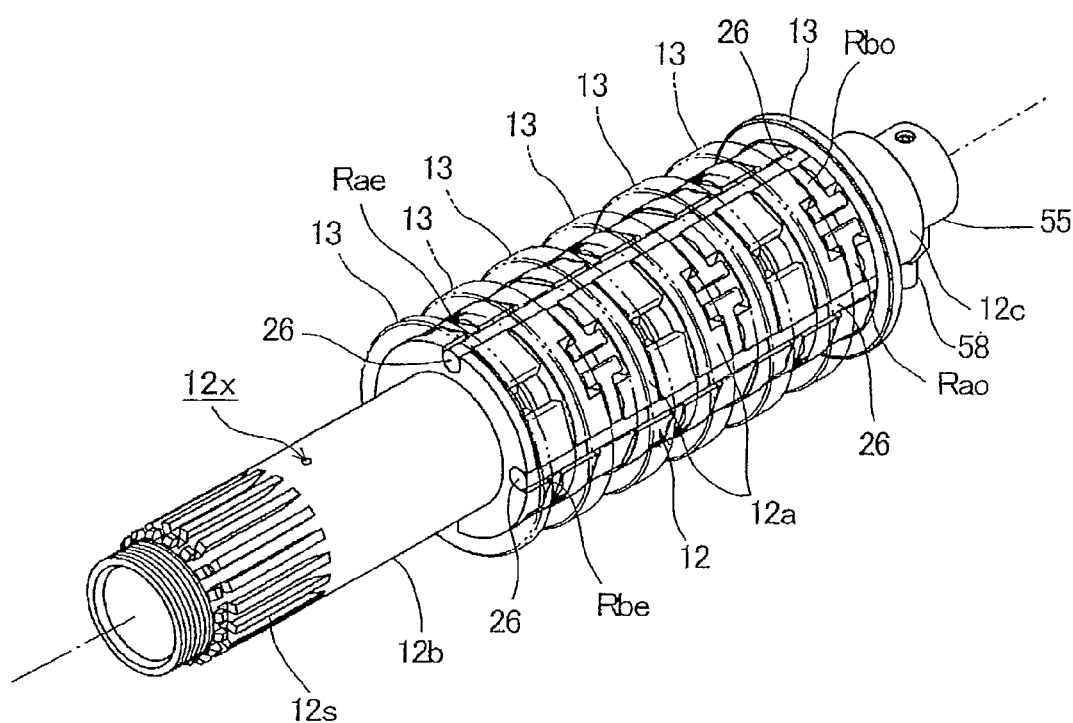
FIG. 19 is a perspective view showing a condition where a single bearing collar member is externally mounted onto the counter gear shaft in the state shown in FIG. 18.

As shown in FIG. 19, the bearing collar members 13 are externally mounted at other axial-direction positions than the long rectangular recesses 12p and the short rectangular recesses 12p of the central hollow cylindrical portion 12a. Each of the bearing collar member 13 is disposed in the manner of bridgingly covering the adjacent pivot pins 26, 26 of the pivot pins 26 which are embedded in continuous rows in the axial grooves 12av, whereby the pivot pins 26 and the swing claw members R are prevented from falling off.

The pivot pins 26 embedded in the axial grooves 12av in the central hollow cylindrical portion 12a of the counter gear shaft 12 are embedded in such a depth as to just touch (or reach) the outer peripheral surface of the central hollow cylindrical portion 12a. When the bearing collar members 13 are externally mounted, therefore, the pivot pins 26 are fixed, without chattering.

The seven bearing collar members 13 are externally mounted to the counter gear shaft 12 at regular intervals, and the driven transmission gears (n) are each rotatably borne thereon in the manner of bridgingly ranging between the adjacent bearing collar members 13, 13.

Each of the driven transmission gears (n) is provided with notches at left and right inner peripheral edge portions (left and right peripheral edge portions of the inner peripheral surface) thereof, with a thin-walled annular rib 30 between the left and right notches, and the left and right bearing collar members 13, 13 are slidably engaged with the notches in the manner of clamping the rib 30 (see FIGS. 9 and 10).

The rib 30 at the inner peripheral surface of each of the driven transmission gears (n) is provided with engaging projected portions 31 at six positions located at regular intervals in the circumferential direction (see FIGS. 9, 10, 11, and 12).

Figure 11:
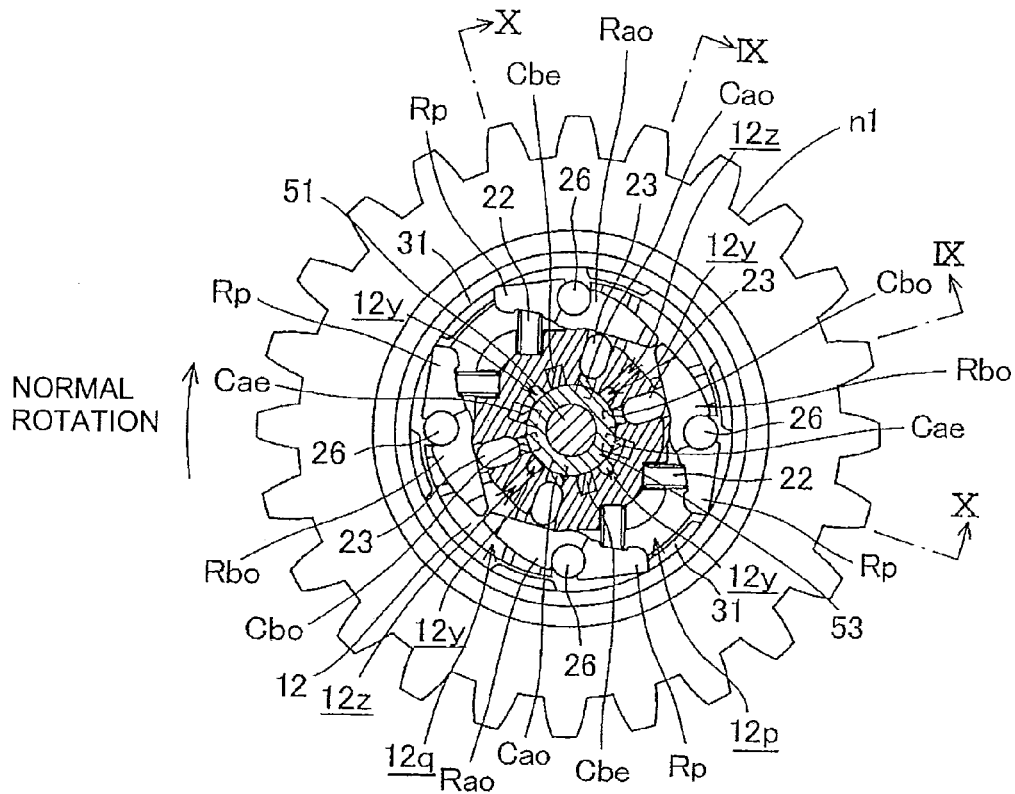
FIG. 11 is a sectional view taken along line XI-XI of FIGS. 9 and 10.
Figure 12:
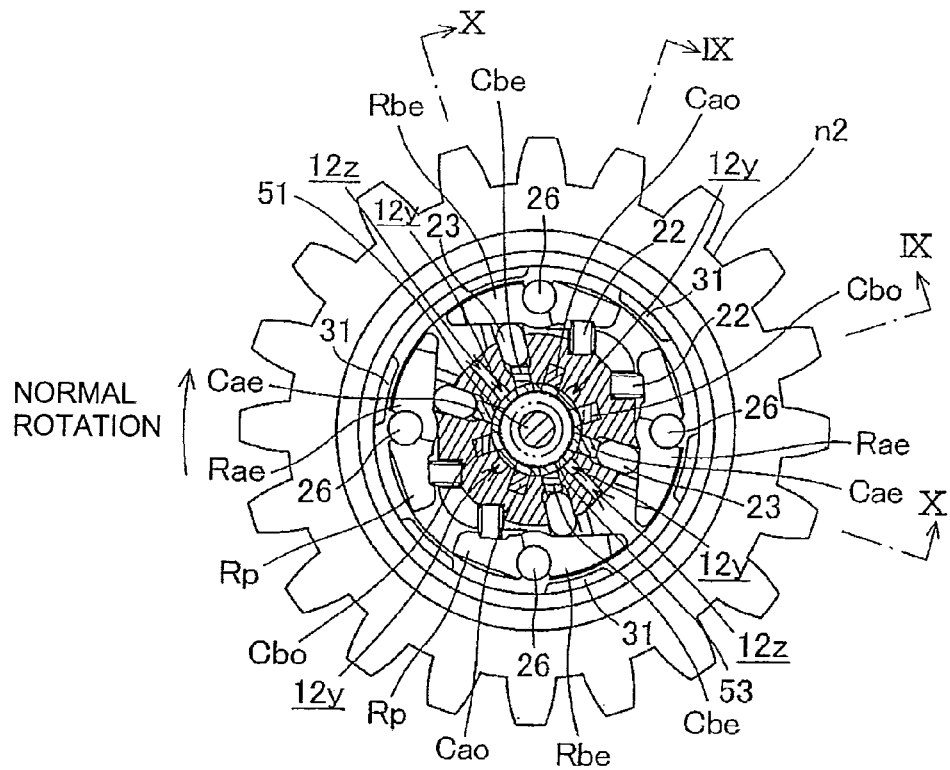
FIG. 12 is a sectional view taken along line XII-XII of FIGS. 9 and 10.

The engaging projecting portion 31 has a thin-walled arcuate shape in a side view (a view in the axial direction as shown in FIGS. 11 and 12), and both end surfaces in the circumferential direction thereof constitute engaging surfaces for engagement with the engaging claw portion Rp of the swing claw member R.

The normal-rotation odd-ordinal speed swing claw member Rao (the normal-rotation even-ordinal speed swing claw member Rae) and the reverse-rotation odd-ordinal engaging member Rbo (the reverse-rotation even-ordinal engaging member Rbe) have the engaging claw portions Rp, Rp extended to mutually facing sides. The normal-rotation odd-ordinal speed swing claw member Rao (the normal-rotation even-ordinal speed swing claw member Rae) abuts on and is engaged with the engaging projected portion 31 in the normal rotation direction of the driven transmission gear (n) (and the counter gear shaft 12). The reverse-rotation odd-ordinal speed swing claw member Rbo (the reverse-rotation even-ordinal speed engaging member Rbe) abuts on and is engaged with the engaging projected portion 31 in the reverse rotation direction of the driven transmission gear (n).

In addition, the normal-rotation odd-ordinal swing claw member Rao (the normal-rotation even-ordinal speed swing claw member Rae) is not put into engagement in the reverse rotation direction of the driven transmission gear (n) even if the engaging claw portion Rp projects outwardly. Similarly, the reverse-rotation odd-ordinal speed engaging member Rbo (the reverse-rotation even-ordinal speed engaging member Rbe) is not put into engagement in the normal rotation direction of the driven transmission gear (n) even if the engaging claw portion Rp projects outwardly.

Now, a procedure for assembling the above-described engaging means 20 onto the counter gear shaft 12 will be described below.

The left and right two lost motion mechanisms 52 and 53 are assembled onto the shift rod 51 fitted with the shift operating element 55, and the eight cam rods Cao, Cao, Cae, Cae, Cbo, Cbo, Cbe, Cbe are disposed in the periphery of the lost motion mechanisms 52 and 53. This assembly is inserted into the inner cavity of the counter gear shaft 12.

In this case, the eight cam rods Cao, Cao, Cae, Cae, Cbo, Cbo, Cbe, Cbe are inserted respectively in the corresponding eight cam guide grooves 12g.

In addition, the left-right moving positions of the eight cam rods Cao, Cao, Cae, Cae, Cbo, Cbo, Cbe, Cbe relative to the counter gear shaft 12 are set in neutral positions.

The counter gear shaft 12 in this condition is set in an erect posture, with its left end portion up.

First as indicated by solid lines in FIG. 12, the bearing collar member 13 at the right end is externally mounted onto the lower end (right end) of the central hollow cylindrical portion 12a. Thereafter, the pin members 23 are inserted into the pin holes 12h in the circumferential groove 12cv corresponding to the lowermost first driven transmission gear n1. One-side ends of the compression springs 22 are supported on the spring receiving portions 12d. The swing claw members R are fitted into the long rectangular recesses 12p, the short rectangular recesses 12q, and the circumferential grooves 12cv. The pivot pins 26 are fitted into the axial grooves 12av on the inner side of the right-end bearing collar member 13 and, simultaneously, fitted into the bearing recesses Rd in the swing claw members R, whereby the swing claw members R are assembled in position.

The cam rods C are in their neutral positions. Therefore, the pin members 23 are advanced in contact with the sliding contact surfaces other than the cam grooves, to push the pin receiving portions Rr of the swing claw members R from the inner side and to swing the latter against the urging force of the compression spring 22, and the engaging claw portions Rp sink into the long rectangular recesses 12p, resulting in a condition where no component is projects outwardly beyond the outer peripheral surface of the central hollow cylindrical portion 12a.

After the four swing claw members R in the circumferential groove 12cv corresponding to the first driven transmission gear n1 are assembled in position, the first driven transmission gear n1 is fitted into position from the upper side, the rib 30 of the first driven transmission gear n1 is abutted on the bearing collar member 13, and the notch is put into engagement, thereby mounting the first driven transmission gear n1. Next, the second bearing collar member 13 is fitted into position from the upper side and engaged with the notch in the first driven transmission gear n1, whereby the second bearing collar member 13 is externally mounted into a predetermined position of the counter gear shaft 12, and the first driven transmission gear n1 is positioned in the axial direction and mounted.

Next, the engaging means 20 for the 2nd driven transmission gear n2 is mounted, and the 2nd driven transmission gear n2 is mounted. Thereafter, this operation is repeated to sequentially mount the remaining 3rd, 4th, 5th, and 6th driven transmission gears n3, n4, n5, and n6, and, finally, the 7th bearing collar member 13 is externally mounted.

In the condition where the six driven transmission gears (n) are thus assembled onto the counter gear shaft 12, the counter gear shaft 12 is rotatably borne on the left and right bearings 7L and 7R fitted to a side wall of the engine case 1 and the bearing cover member 8, resulting in that the six driven transmission gears (n) and the seven bearing collar members 13 are alternately combined with each other, clamped from the left and right sides, and positioned in the axial direction.

The bearing collar members 13 bear axial forces of each of the driven transmission gears (n), and can thereby contribute to positioning in the axial direction and receiving of thrust forces.

In this manner, the 1st, 2nd, 3rd, 4th, 5th, and 6th driven transmission gears n1, n2, n3, n4, n5, and n6 are rotatably borne on the counter gear shaft 12 through the bearing collar members 13.

Since the cam rods C are in the neutral positions, all the driven transmission gears (n) are in a disengaged condition where, due to the moving positions of the cam rods C of the engaging means 20 corresponding respectively to the driven transmission gears (n), the pin members 23 project so that the pin receiving portions Rr of the swing claw members R are pushed up from the inner side, and the engaging claw portions Rp are therefore retracted to the inner side. In this condition, the driven transmission gears (n) can be freely rotated relative to the counter gear shaft 12.

On the other hand, when, due to the moving positions other than the neutral positions of the cam rods C of the engaging means 20, the pin members 23 are brought into the cam grooves (v) to swing the swing claw members R and to attain an engaged condition where the engaging claw portions Rp project outwardly, the engaging projected portions 31 of the corresponding driven transmission gear (n) are abutted on the engaging claw portions Rp, so that the rotation of the driven transmission gear (n) is transmitted to the counter gear shaft 12 or the rotation of the counter gear shaft 12 is transmitted to the driven transmission gear (n).

In the shift drive mechanism 50, driving of the shift motor 80 turns the shift drum 67 by a predetermined amount, the turning of the shift drum 67 moves the shift rod 51 by a predetermined amount in the axial direction through the function of the shift pin 58 fitted in the shift guide groove G, and the eight cam rods Cao, Cao, Cae, Cae, Cbo, Cbo, Cbe, Cbe in the engaging means 20 are moved in an interlocking manner through the functions of the lost motion mechanisms 52 and 53.

With the cam rods C moved in the axial direction, the pin members 23 in sliding contact with the cam surfaces of the cam rods C are individually advanced into or retracted from the cam grooves (v), whereby the swing claw members R are swung to be disengaged from a given driven transmission gear (n) and engaged with an other driven transmission gear (n). In this manner, the driven transmission gear (n) engaged with the counter gear shaft 12 is changed, whereby a shift is performed.

Hereinafter, a lubrication structure in the counter gear shaft 12 of the multi-speed transmission 10 will be described.

Referring to FIG. 6, the counter gear shaft 12 is provided, in its portion on which the above-mentioned collar member 33 is to be fitted, with a plurality of oil feed introducing holes 12x penetrating the portion in radial directions. Correspondingly to this, the collar member 33 is also provided with introducing holes 33x, and its outer periphery is covered with an annular seal member 39.

In addition, as illustrated in the left side view of the counter gear shaft 12 shown in FIG. 16, the inner peripheral surface of the inner cavity of the counter gear shaft 12 is formed, by cutting in parallel to the eight cam guide grooves 12g, with axial oil feed grooves 12y at four radial positions (positions located at regular intervals along the circumferential direction) so arranged that two of the cam guide grooves 12g are located between each adjacent pair of the axial oil feed grooves 12y (see FIGS. 11 and 12).

Each of the axial oil feed grooves 12y communicates with radial oil feed holes 12z bored in the radial directions at axial-direction positions where required ones of the pin members 23 are present, and the radial oil feed holes 12z provide communication between the axial oil feed grooves 12*y* and the circumferential grooves 12*cv* in which the swing claw members R are fitted.

In addition, each of the axial oil feed grooves 12*y* does not communicate with the radial oil feed holes 12*z* bored at the axially adjacent ones of the axial-direction positions where the pin members 23 are located. Instead, each of the axial oil feed grooves 12*y* communicates with the radial oil feed holes 12*z* at every other axial-direction positions.

More specifically, of the four axial oil feed grooves 12*y*, one opposed pair of the axial oil feed grooves 12*y* communicate with the radial oil feed holes 12*z* opening into the circumferential grooves 12*cv* where the pin members 23 corresponding to the odd-ordinal speed gears (the 1st, 3rd, and 5th driven transmission gears n1, n3, and n5) are located (see FIG. 11), whereas the other opposed pair of the axial oil feed grooves 12*y* communicate with the radial oil feed holes 12*z* opening into the circumferential grooves 12*cv* where the pin members 23 corresponding to the even-ordinal speed gears (the 2nd, 4th, and 6th driven transmission gears n2, n4, and n6) are located (see FIG. 12).

A lubricating oil introduced into an end portion of the inner cavity of the counter gear shaft 12 via the oil feed introducing holes 12*x* is guided in the axial direction along the inner peripheral surface of the inner cavity of the counter gear shaft 12 by the axial oil feed grooves 12*y*. Therefore, the whole part of the engagement switch-over mechanism (the engaging means 20 such as the swing claw members R, the pin members 23, the compression springs 22, etc. and the cam rods C) can be smoothly supplied with the lubricating oil and be sufficiently lubricated, while reducing the oil passage resistance against oil passage in the axial direction and even while using a small-type oil feed actuator.

The axial oil feed grooves 12*y* are formed in a number of four, and each of the axial oil feed grooves 12*y* does not communicate with the radial oil feed holes 12*z* bored at axially adjacent ones of the axial-direction positions where the pin members 23 are located. Therefore, the lubricating oil fed from one end of the axial oil feed groove 12*y* can be passed to the other end without a considerable lowering in the oil pressure, and the engagement switch-over mechanism arranged in the axial direction can be fed with the lubricating oil substantially evenly.

Now, a process of an up-shift from a 1st-speed condition to a 2nd-speed condition with one step down in reduction gear ratio at the time of acceleration by driving of the internal combustion engine will be described below according to FIGS. 20(*a*) to 24(*d*).

Figure 20A:
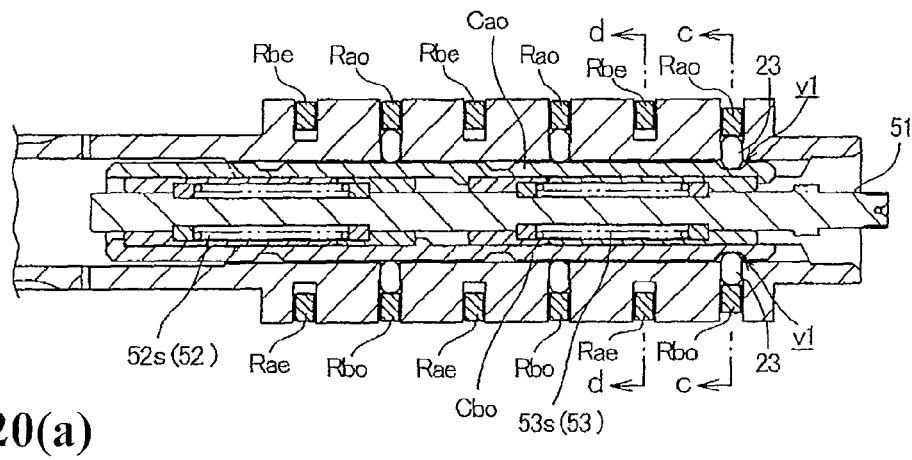
FIGS. 20(a) to 20(d) illustrate a 1st-speed condition at the time of starting an up-shift.
Figure 20B:
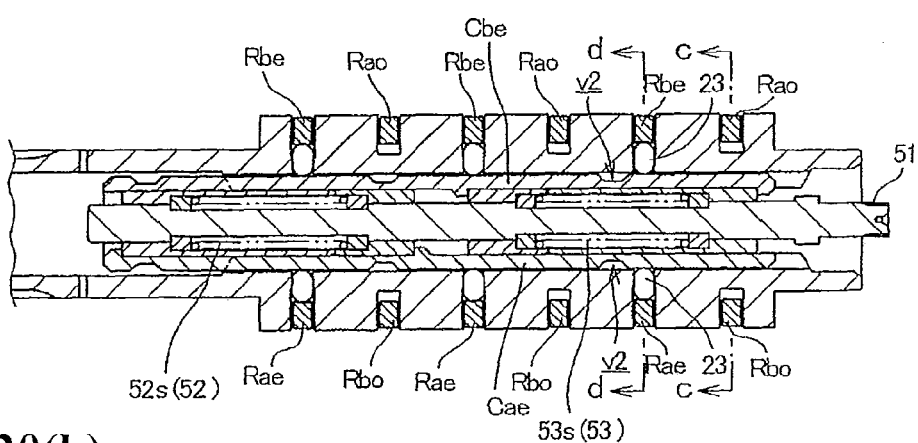

FIGS. 20(*a*) to 24(*d*) sequentially illustrate changes with time. In the drawings, FIGS. 20(*a*) to 24(*a*) are sectional views obtained by omitting the gears and the like from FIG. 9 (sectional view taken along line IX-IX of FIGS. 11 and 12), FIGS. 20(*b*) to 24(*b*) are sectional views obtained by omitting the gears and the like from FIG. 10 (sectional view taken along line X-X of FIGS. 11 and 12), FIGS. 20(*c*) to 24(*d*) are sectional views (sectional views of the 1st driven transmission gear n1) taken along line c-c of FIGS. 20(*a*) to 24(*a*) and 20(*b*) to 24(*b*), and FIGS. 20(*d*) to 24(*d*) are sectional views (sectional views of the 2nd driven transmission gear n2) taken along line d-d of FIGS. 20(*a*) to 24(*a*) and 20(*b*) to 24(*b*).

The power of the internal combustion engine is transmitted through the friction clutch 5 to the main gear shaft 11, whereby the 1st, 2nd, 3rd, 4th, 5th, and 6th drive transmission gears m1, m2, m3, m4, m5, and m6 are rotated as one body, and the 1st, 2nd, 3rd, 4th, 5th, and 6th driven transmission gears n1, n2, n3, n4, n5, and n6 in constant mesh with them respectively are rotated at respective rotating speeds.

FIGS. 20(*a*) to 20(*d*) illustrate the 1st-speed condition. In FIG. 20(*c*), the 1st driven transmission gear n1 is rotated in the direction of arrow, and, in FIG. 20(*d*), the 2nd driven transmission gear n2 is rotated in the direction of arrow, wherein the 2nd driven transmission gear n2 is rotated at a higher speed as compared with the 1st driven transmission gear n1.

Only the pin members 23 of the engaging means 20 corresponding to the 1st driven transmission gear n1 are put in the cam grooves v1 of the normal-rotation odd-ordinal speed cam rods Cao (see FIG. 20(*a*)). Therefore, the normal-rotation odd-ordinal speed swing claw members Rao of the engaging means 20 project their engaging claw portions Rp outwards, so that the engaging projected portions 31 of the rotating 1st driven transmission gear n1 are engaged with the engaging claw portions Rp of the normal-rotation odd-ordinal speed swing claw members Rao (see FIG. 20(*c*)), and the counter gear shaft 12 is rotated together with the 1st driven transmission gear n1 at the same rotating speed as the 1st driven transmission gear n1.

In addition, in FIGS. 20(*a*) to 27(*d*), the swing claw members R and the engaging projected portions 31 which are transmitting power effectively are cross-hatched.

In this 1st-speed condition, the 2nd driven transmission gear n2 is in idle rotation, since the pin members 23 of the engaging means 20 corresponding thereto are projected out of the cam grooves v2 in the even-ordinal speed cam rods Cae and Cbe (see FIG. 20(*b*)) and the even-ordinal speed swing claw members Rae and Rbe in the engaging means 20 are retracting their engaging claw portions Rp to the inside.

The other, 3rd, 4th, 5th and 6th driven transmission gears n3, n4, n5, and n6 are also in idle rotation (see FIGS. 20(*a*) and 20(*b*)).

When a shift selecting lever is manually operated in order to effect a shift to the 2nd gear speed and the shift drum 67 is turned to cause the shift rod 51 to start moving to the right in the axial direction, the eight cam rods Cao, Cao, Cae, Cae, Cbo, Cbo, Cbe, Cbe are ready to be moved to the right in the axial direction in an interlocking manner through the functions of the coil springs 52*s* and 53*s* of the lost motion mechanisms 52 and 53.

Referring to FIGS. 21(*a*) and 21(*c*), the reverse-rotation odd-ordinal speed cam rods Cbo on one side are moved with little resistance, since the reverse-rotation odd-ordinal speed swing claw members Rbo operated through the function of the pin members 23 are not engaged with the engaging projected portions 31 of the 1st driven transmission gear n1, so that the pin members 23 having been in the cam grooves v1 are released and project out of the cam grooves v1 (see FIG. 21(*a*)), whereby the reverse-rotation odd-ordinal speed swing claw members Rbo are swung and their engaging claw portions Rp are gradually retracted inwardly (see FIG. 21(*c*)).

On the other hand, at the normal-rotation odd-ordinal speed cam rods Cao on the other side, the normal-rotation odd-ordinal speed swing claw members Rao operated through the function of the pin members 23 are in engagement with the engaging projected portions 31 of the 1st driven transmission gear n1 and are receiving power from the 1st driven transmission gear n1, so that a considerably strong frictional resistance is experienced in swinging the normal-rotation odd-ordinal speed swing claw members Rao so as to disengage them. Therefore, even if the force of the coil spring 53*s* in the lost motion mechanism 53 is going to move the normal-rotation odd-ordinal speed cam rods Cao so as to project the pin members 23 along slant side surfaces of the cam grooves v1, it is impossible to push up and swing the normal-rotation odd-ordinal speed swing claw members Rao. More specifically, at the time when the pin members 23 have just started moving up along the slant side surfaces of the cam grooves v1, the normal-rotation odd-ordinal speed cam rods Cao are stopped, and a condition where the disengagement is impossible is kept as it is (see FIGS. 21(a) and 21(c)).

In the condition illustrated in FIGS. 21(a) to 21(d), at the 2nd driven transmission gear n2, the normal-rotation even-ordinal speed cam rods Cae can be moved without resistance, but the pin members 23 have not yet entered the cam grooves v2, and the even-ordinal speed swing claw members Rae and Rbe show no change (see FIGS. 21(b) and 21(d)).

In addition, since the normal-rotation odd-ordinal speed cam rods Cao are in a stopped state together with the spring holder 53h of the lost motion mechanism 53 put into lock therewith, the reverse-rotation even-ordinal speed cam rods Cbe engaged with the spring holder 53h are also in a stopped state.

In the condition where the normal-rotation odd-ordinal speed cam rods Cao are in a stopped state, when the shift rod 51 is moved further to the right to reach a 2nd-speed position, the normal-rotation even-ordinal speed cam rods Cae are also moved further to the right together with the reverse-rotation odd-ordinal speed cam rods Cbo. Consequently, as shown in FIG. 22(b), the pin members 23 enter the cam grooves v2 of the normal-rotation even-ordinal speed cam rods Cae. Therefore, the normal-rotation even-ordinal speed swing claw members Rae are swung by the urging forces of the compression springs 22 and the centrifugal forces of the engaging claw portions Rp, to project their engaging claw portions Rp to the outside (see FIG. 22(d)).

In addition, the reverse-rotation even-ordinal speed cam rods Cbe are left in the stopped state, and the engaging claw portions Rp of the reverse-rotation even-ordinal speed swing claw members Rbe are left retracted to the inside.

Figure 23A:
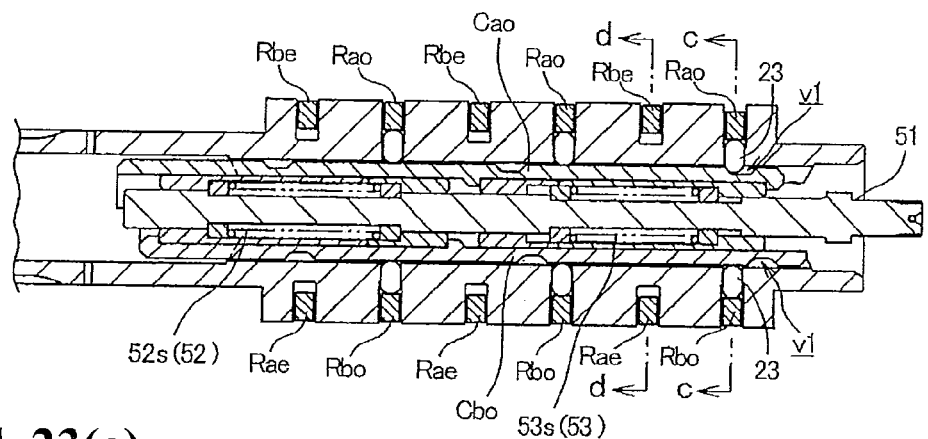
FIGS. 23(a) to 23(d) illustrate the subsequent process.
Figure 23B:
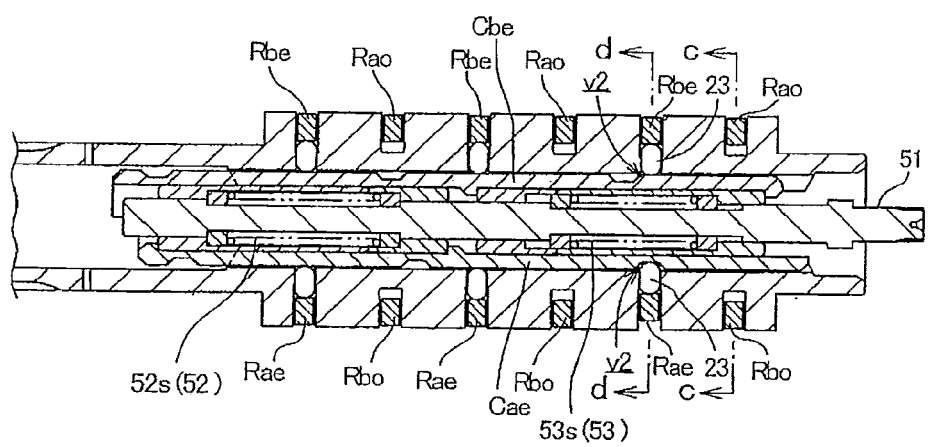
Figures 23C, 23D:
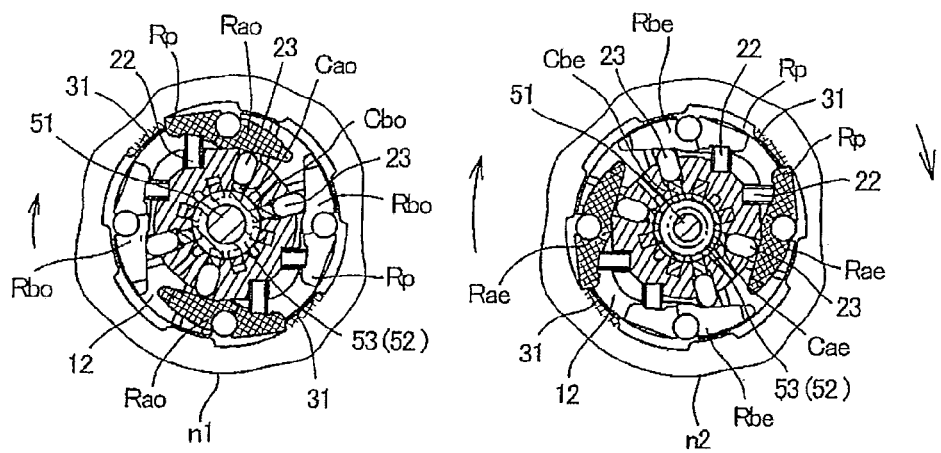

Then, the engaging projected portions 31 of the 2nd driven transmission gear n2 rotated at a higher speed than the counter gear shaft 12 rotated together with the 1st driven transmission gear n1 catch up with and abut on the outwardly projected engaging claw portions Rp of the normal-rotation even-ordinal swing claw members Rae (see FIG. 23(d)).

At this moment, referring to FIGS. 23(c) and 23(d), abutment of the engaging projected portions 31 of the 2nd driven transmission gear n2 on the normal-rotation even-ordinal speed swing claw members Rae and abutment of the engaging projected portions 31 of the 1st driven transmission gear n1 on the normal-rotation odd-ordinal speed swing claw members Rao are generated simultaneously.

Figure 24A:
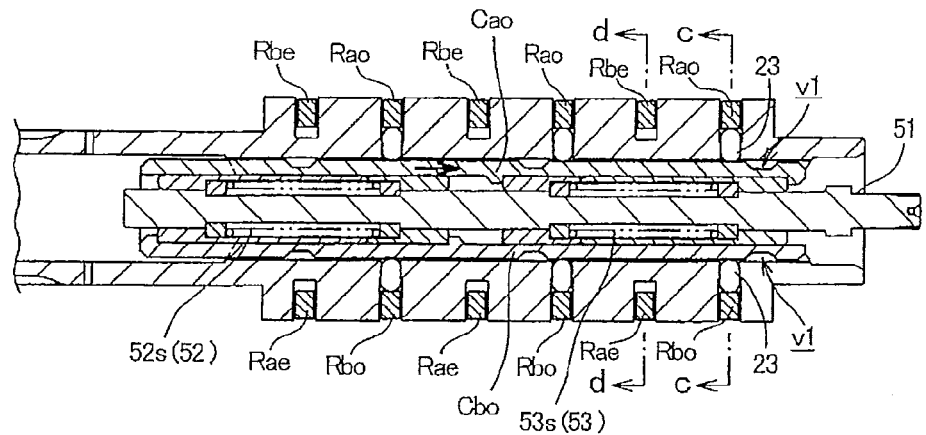
FIGS. 24(a) to 24(d) illustrate a 2nd-speed condition upon completion of the up-shift.
Figure 24B:
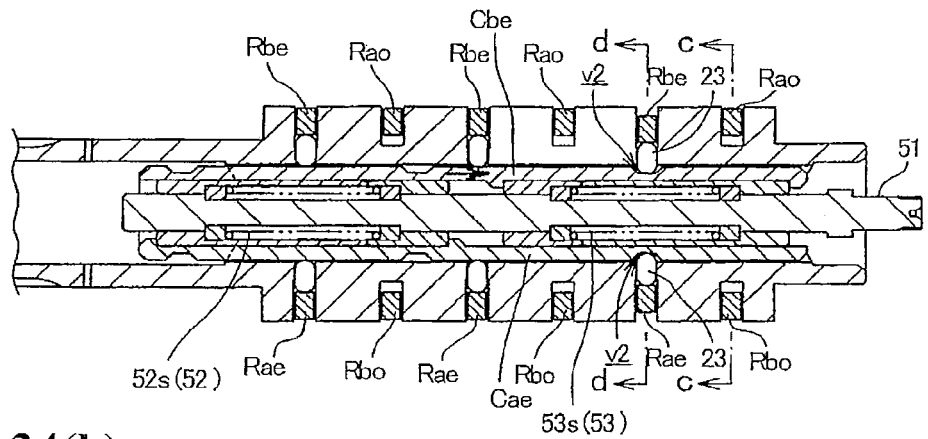
Figures 24C, 24D:
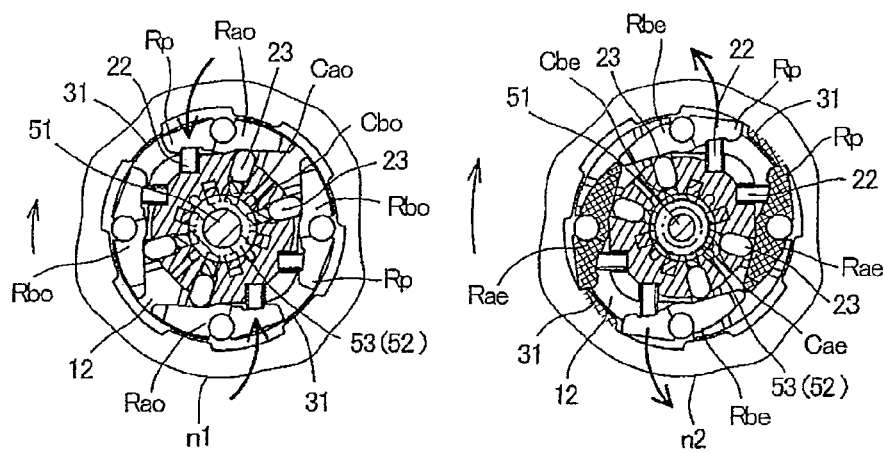

Therefore, from immediately after this moment, the counter gear shaft 12 is caused to start rotating at the same rotating speed as the 2nd driven transmission gear n2 by the 2nd driven transmission gear n2 rotated at a higher speed (see FIG. 24(d)), and the engaging claw portions Rp of the normal-rotation odd-ordinal speed swing claw members Rao are separated from the engaging projected portions 31 of the 1st driven transmission gear n1, whereby an actual up-shift from the 1st gear speed to the 2nd gear speed is performed.

With the engaging claw portions Rp of the normal-rotation odd-ordinal speed swing claw members Rao separated from the engaging projected portions 31 of the 1st driven transmission gear n1, the frictional resistance for fixing the normal-rotation odd-ordinal speed swing claw members Rao is lost, the normal-rotation odd-ordinal speed cam rods Cao having been urged by the coil spring 53s of the lost motion mechanism 53 are moved to the right with a delay, and the pin members 23 having been in the cam grooves v1 are released out of the latter, to swing the normal-rotation odd-ordinal swing claw members Rao and thereby to retract the engaging claw portions Rp to the inside (see FIG. 24(c)).

The movement of the normal-rotation odd-ordinal speed cam rods Cao causes the reverse-rotation even-ordinal speed cam rods Cbe to be also moved through the function of the spring holder 53h of the lost motion mechanism 53, whereby the pin members 23 are brought into the cam grooves v2 of the reverse-rotation even-ordinal speed cam rods Cbe, and the reverse-rotation even-ordinal speed swing claw members Rbe are swung to project their engaging claw portions Rp to the outside, completing the shift (see FIG. 24(d)).

In this manner, the shift operation from the 1st gear speed to the 2nd gear speed is completed. The condition shown in FIGS. 24(a) to 24(d) are the 2nd-speed condition.

As above-mentioned, in the up-shift from the 1st-speed condition to the 2nd-speed condition with one step down in reduction gear ratio, in the condition where the engaging projected portions 31 of the 1st driven transmission gear n1 abut on and are engaged with the engaging claw portions Rp of the normal-rotation odd-ordinal speed swing claw members Rao to thereby rotate the counter gear shaft 12 at the same speed as the first driven transmission gear n1 as shown in FIGS. 23(a) to 23(d), the engaging projected portions 31 of the 2nd driven transmission gear n2 rotated at a higher speed catch up with and abut on the engaging claw portions Rp of the normal-rotation even-ordinal swing claw members Rae, to rotate the counter gear shaft 12 together with the 2nd driven gear shaft n2 at the higher speed, thereby achieving the shift. Therefore, the engaging claw portions Rp of the normal-rotation odd-ordinal speed swing claw members Rao are gradually separated from the engaging projected portions 31 of the 1st driven transmission gear n1 in a natural manner, so that disengagement thereof takes place smoothly. Accordingly, no force is needed for the disengagement, a smooth operation is achieved, and a smooth up-shift is realized.

Also in each of up-shifts from the 2nd gear speed to the 3rd gear speed, from the 3rd gear speed to the 4th gear speed, from the 4th gear speed to the 5th gear speed, and from the 5th gear speed to the 6th gear speed, the up-shift is performed by a process in which in the condition where the driven transmission gear (n) is engaged with given swing claw members R, the driven transmission gear (n) comes to be engaged with the swing claw members R with one step down in reduction gear ratio as compared to the given swing claw members R. Therefore, no force is needed for the disengagement, and a smooth operation is achieved. This ensures that no clutch for shift is needed, no loss is present in the switch-over time at the time of an up-shift, omission of the driving force is obviated, the shift shock is weak, and a smooth up-shift can be achieved.

Figures 20C, 20D:
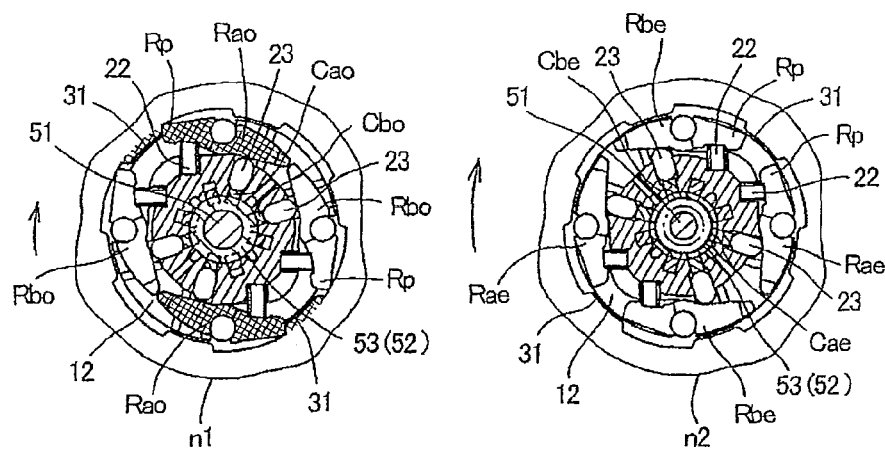

For example, when the system is in the 1st-speed condition, as shown in FIG. 20(c), the normal-rotation odd-ordinal speed swing claw members Rao are in engagement with the engaging projected portions 31 of the 1st driven transmission gear n1, and the engaging claw portions Rp of the reverse-rotation odd-ordinal speed swing claw members Rbo on the other side are in proximity to and engageable with the engaging projected portions 31.

Therefore, when the vehicle speed is decelerated and a driving force from a rear wheel is exerted on the counter gear shaft 12 with the result of a change in the direction of the driving force, the engagement of the engaging projected portions 31 of the 1st driven transmission gear n1 with the normal-rotation odd-ordinal speed swing claw members Rao is speedily switched over to the engagement with the reverse-rotation odd-ordinal speed swing claw members Rbo. Accordingly, the engagement can be smoothly handed over and maintained.

Now, a process of a down-shift from the 2nd-speed condition to the 1st-speed condition with one step up in reduction gear ratio during when the vehicle speed is decelerated will be described below according to FIGS. 25(a) to 27(d).

FIGS. 25(a) to 25(d) illustrate a condition immediately after a deceleration in the 2nd-speed condition.

Figure 25A:
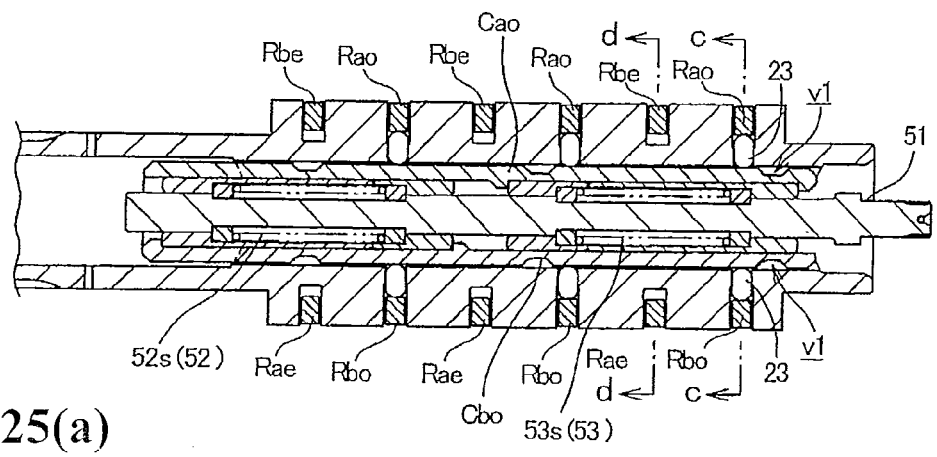
FIGS. 25(a) to 25(d) illustrate the 2nd-speed condition at the time of starting a down-shift.
Figure 25B:
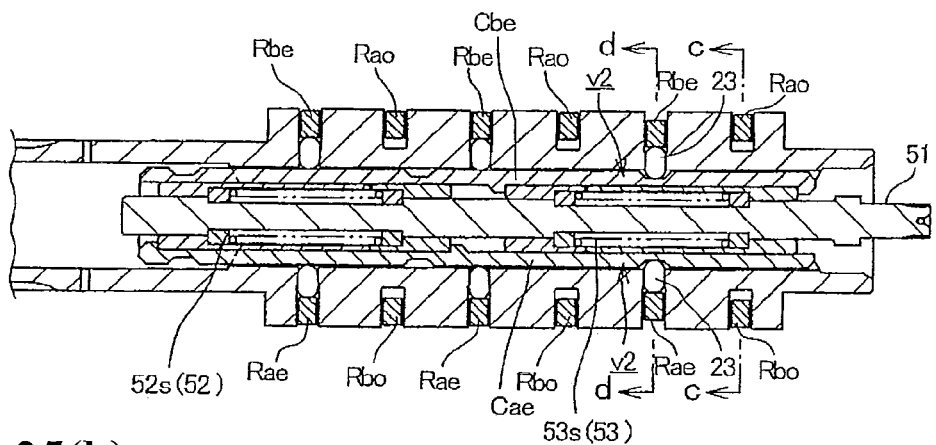
Figures 25C, 25D:
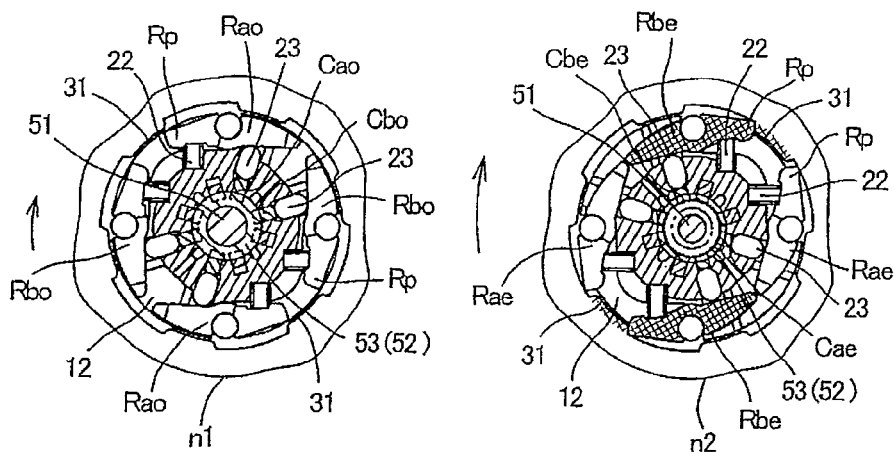

Due to the deceleration, a driving force is exerted on the counter gear shaft 12 from the rear wheel. In this case, as shown in FIG. 25(d), the engaging claw portions Rp of the reverse-rotation even-ordinal speed swing claw members Rbe which have been in an engageable condition are actually engaged with the engaging projected portion 31 of the 2nd driven transmission gear n2 lowered in rotating speed, so that a rotating force of the counter gear shaft 12 is transmitted to the 2nd driven transmission gear n2. More specifically; the so-called engine brake is being applied.

When in this condition the shift selecting lever is manually operated to turn the shift drum 67 by a predetermined amount in the direction reverse to the above-mentioned and to move the shift rod 51 to the left in the axial direction, in order to make a down-shift to the 1st gear speed, the eight cam rods Cao, Cao, Cae, Cae, Cbo, Cbo, Cbe, Cbe become ready to be moved to the left in the axial direction in an interlocking manner through the function of the coil springs 52s and 53s of the lost motion mechanisms 52 and 53. However, since the reverse-rotation even-ordinal speed swing claw members Rbe operated through the function of the pin members 23 are in engagement with the engaging projected portions 31 of the 2nd driven transmission gear n2 and are receiving power from the 2nd driven transmission gear n2, a considerably strong frictional resistance is experienced in swinging the reverse-rotation even-ordinal speed swing claw members Rbe so as to disengage them. Therefore, at the time when the pin members 23 have just started moving up along slant side surfaces of the cam grooves v2, the reverse-rotation even-ordinal speed cam rods Cbe are stopped, and a condition where the disengagement is impossible is kept as it is (see FIGS. 26(b) and 26(d)).

In addition, together with the reverse-rotation even-ordinal speed cam rods Cbe, the normal-rotation odd-ordinal speed cam rods Cao are also kept in a stopped state through the function of the spring holder 53h of the lost motion mechanism 53.

On the other hand, the normal-rotation even-ordinal speed cam rods Cae are moved to the left with little resistance, since the normal-rotation even-ordinal speed swing claw members Rae operated through the function of the pin members 23 are not in engagement with the engaging projected portions 31 of the 2nd driven transmission gear n2. The movement of the normal-rotation even-ordinal speed cam rods Cae causes the pin members 23 having been in the cam grooves v2 to be projected out of the cam grooves v2, thereby swinging the normal-rotation even-ordinal speed swing claw members Rae and retracting their engaging claw portions Rp to the inside (see FIG. 26(d)).

Figure 26A:
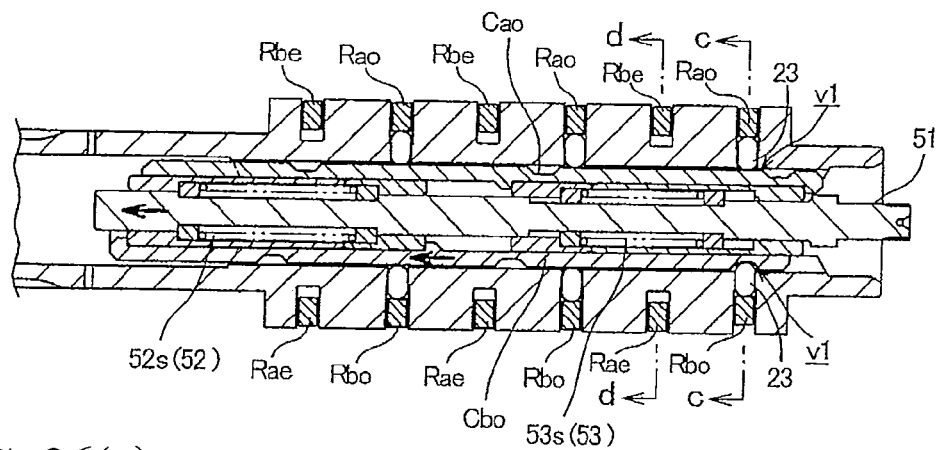
FIGS. 26(a) to 26(d) illustrate one process during a down-shift operation.
Figure 26B:
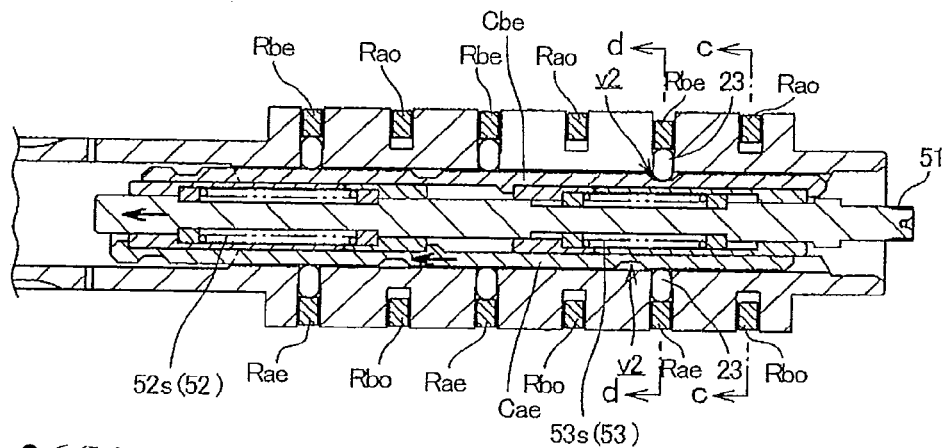
Figures 26C, 26D:
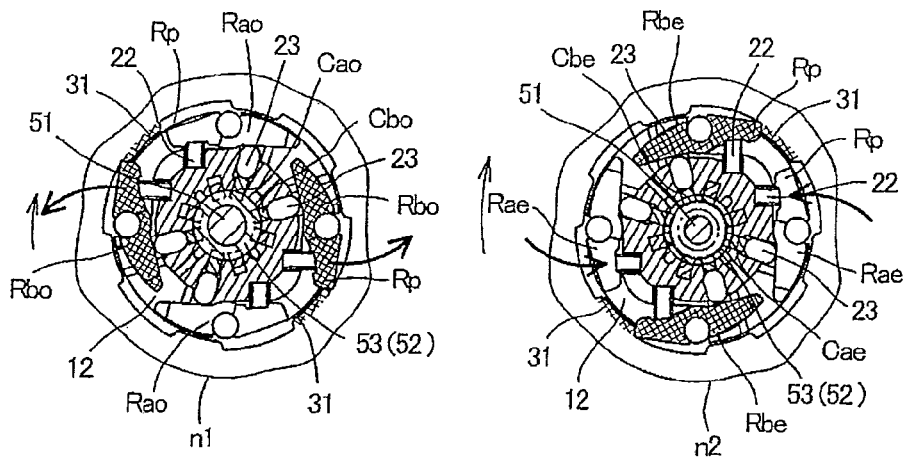

As for the 1st driven transmission gear n1, the reverse-rotation odd-ordinal speed cam rods Cbo are moved to the left without resistance, the pin members 23 enter the cam grooves v1 of the reverse-rotation odd-ordinal speed cam rods Cbo (see FIG. 26(a)), and the reverse-rotation odd-ordinal speed swing claw members Rbo are swung by urging forces of the compression springs 22 and centrifugal forces of their engaging claw portions Rp, to project the engaging claw portions Rp to the outside (see FIG. 26(c)).

After the normal-rotation even-ordinal speed swing claw members Rae retract their engaging claw portions Rp to the inside, the reverse-rotation odd-ordinal speed swing claw members Rbo project their engaging claw portions Rp to the outside.

When the reverse-rotation odd-ordinal speed swing claw members Rbo are rotated together with the counter gear shaft 12 to catch up with and abut on the engaging projected portions 31 of the 1st driven transmission gear n1, as shown in FIGS. 26(c) and 26(d), there is a moment at which both the engaging projected portions 31 of the 2nd driven transmission gear n2 and the engaging projected portions 31 of the 1st driven transmission gear n1 simultaneously abut on the engaging claw portions Rp of the reverse-rotation even-ordinal speed swing claw members Rbe and on the engaging claw portions Rp of the reverse-rotation odd-ordinal speed swing claw members Rbo, respectively.

From immediately after this moment, engagement with the 1st driven transmission gear n1 rotated at a lower speed becomes effective, and disengagement from the 2nd driven transmission gear n2 takes place, whereby a down-shift from the 2nd gear speed to the 1st gear speed is achieved.

Figure 27A:
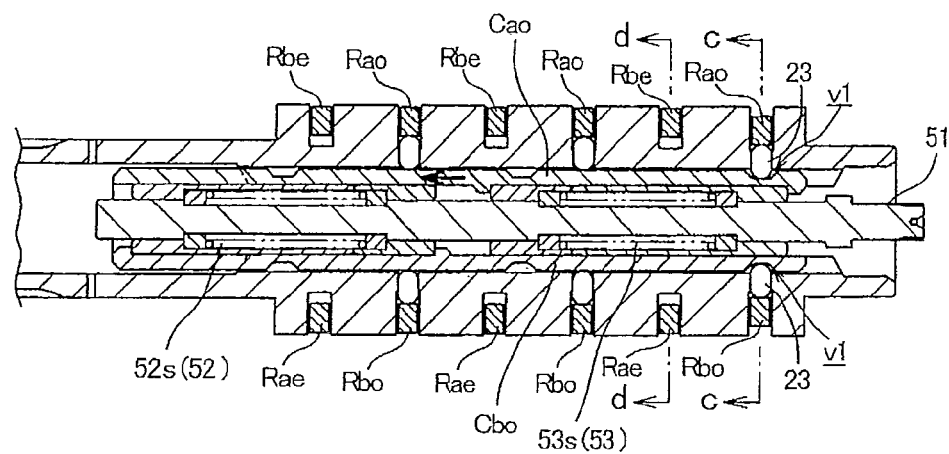
FIGS. 27(a) to 27d) illustrate a 1st-speed condition upon completion of the down-shift.
Figure 27B:
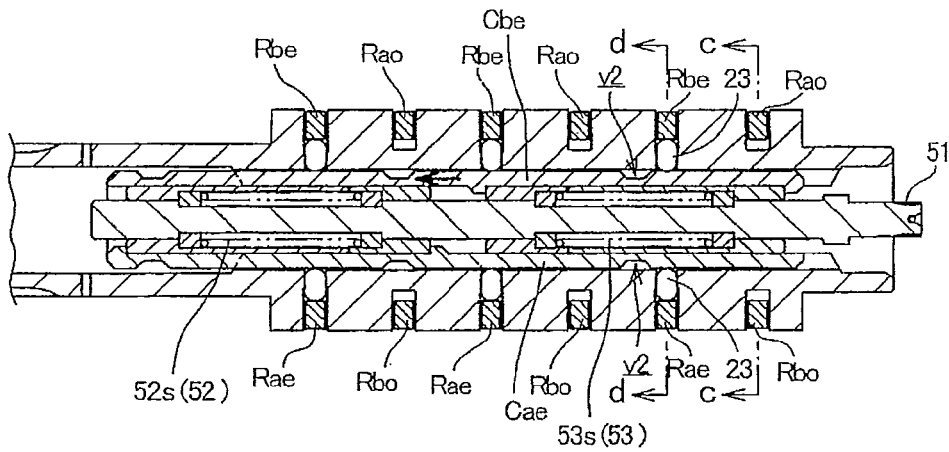
Figures 27C, 27D:
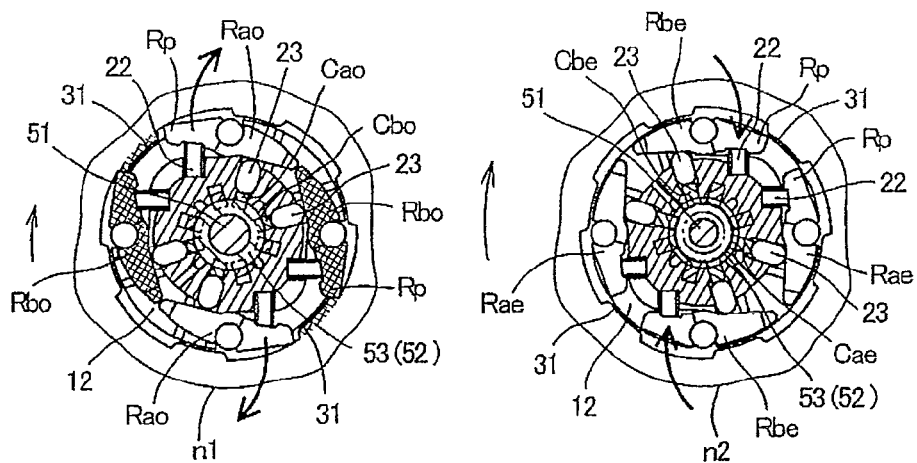

With the engaging projected portions 31 of the 2nd driven transmission gear n2 and the reverse-rotation even-ordinal speed cam rods Cbe disengaged from each other, the frictional resistance fixing the reverse-rotation even-ordinal speed swing claw members Rbe is lost, the reverse-rotation even-ordinal speed cam rods Cbe having been urged by the coil spring 53s of the lost motion mechanism 53 are moved to the left with a delay, and the pin members 23 having been in the cam grooves v2 come out of the cam grooves v2 (see FIG. 27(b)), whereby the reverse-rotation even-ordinal speed swing claw members Rbe are swung to retract their engaging claw portions Rp to the inside (see FIG. 27(d)).

With the reverse-rotation even-ordinal speed cam rods Cbe moved, the normal-rotation odd-ordinal speed cam rods Cao are also moved through the function of the spring holder 53h of the lost motion mechanism 53, and the pin members 23 enter the cam grooves v1 of the normal-rotation odd-ordinal speed cam rods Cao, whereby the normal-rotation odd-ordinal speed swing claw members Rao are swung to project their engaging claw portions Rp to the outside, thereby completing the shift (see FIG. 27(c)).

In this condition, the shift operation from the 2nd gear speed to the 1st gear speed is completed.

In this manner, in the down-shift from the 2nd speed condition to the 1st speed condition with one step up in reduction gear ratio, in the condition where the engaging claw portions Rp of the reverse-rotation even-ordinal speed swing claw members Rbe are in abutment on and in engagement with the engaging projected portions 31 of the 2nd driven transmission gear n2 as shown in FIG. 26, the engaging claw portions Rp of the reverse-rotation odd-ordinal speed swing claw members Rbo catch up with and are engaged with the engaging projected portions 31 of the 1st driven transmission gear n1 rotated at a lower speed, resulting in a switch-over of engagement. Therefore, the engaging projecting portions 31 of the 2nd driven transmission gear n2 and the engaging claw portions Rp of the reverse-rotation even-ordinal speed swing claw members Rbe are disengaged from each other smoothly. This ensures that no force is required for the disengagement, a smooth operation is achieved, and a smooth down-shift can be realized.

Also in each of down-shifts from the 6th gear speed to the 5th gear speed, from the 5th gear speed to the 4th gear speed, from the 4th gear speed to the 3rd gear speed, and from the 3rd gear speed to the 2nd gear speed, the down-shift is performed by a process in which in the condition where the driven transmission gear (n) is engaged with given swing claw members R, the driven transmission gear (n) comes to be engaged with the swing claw members R with one step up in reduction gear ratio as compared to the given swing claw members R. Therefore, no force is required for the disengagement, and a smooth operation is achieved. This ensures that no clutch for shift is needed, no loss is present in the switch-over time at the time of a down-shift. Thus, omission of the driving force is obviated, the shift shock is weak, and a smooth down-shift can be performed.

For example, when the system is in the 2nd speed condition, as shown in FIG. 25(d), the reverse-rotation even-ordinal speed swing claw members Rbe are in engagement with the engaging projected portions 31 of the 2nd driven transmission gear n2, and the engaging claw portions Rp of the normal-rotation even-ordinal speed swing claw members Rae on the other side are in proximity to and engageable with the engaging projected portions 31.

Therefore, when the vehicle speed is accelerated and a driving force from the internal combustion engine is exerted on the 2nd driven transmission gear n2 with the result of a change in the direction of the driving force, the engagement of the engaging projected portions 31 of the 2nd driven transmission gear n2 with the reverse-rotation even-ordinal speed swing claw members Rbe is speedily switched over to the engagement with the normal-rotation even-ordinal speed swing claw members Rae. Accordingly, the engagement can be smoothly handed over and maintained.

In addition, in the present multi-speed transmission 10, at the time of acceleration by driving of the internal combustion engine, simply moving the shift rod 51 to the left in the axial direction in an attempt to perform a down-shift cannot release the engagement of the swing claw members R and the driven transmission gear (n) which are transmitting power. In view of this, for performing a down-shift at the time of acceleration, a shift operation is carried out in the condition where the vehicle has been decelerated by once disengaging the friction clutch 5 before the shift operation is conducted. In this manner, the engagement is smoothly switched over to the engagement of the swing claw members R and a driven transmission gear (n) which is one step higher in reduction gear ratio than the driven transmission gear (n) having been transmitting power. Thereafter, the friction clutch 5 is engaged and acceleration is performed.

In the case where the friction clutch 5 is not adopted, the rotating speed of the driven transmission gear (n) is momentarily lowered separately by drive source rotating speed reducing means such as ignition timing control or fuel injection quantity control, whereby a down-shift can be smoothly carried out even at the time of acceleration.

When the vehicle is decelerated and a driving force from the rear wheel is acting on the counter gear shaft 12, even if the shift rod 51 is moved to the right in the axial direction in an attempt to perform an up-shift, the intended shift cannot be achieved. In addition, a shift shock would be generated when the driven transmission gear (n) one step lower in reduction gear speed than the previously effective driven transmission gear (n) is engaged with the swing claw members R upon the subsequent acceleration. In view of this, the up-shift operation is inhibited at the time of deceleration, whereby generation of a shift shock can be prevented assuredly.

By moving in the axial direction the cam rods C fitted in the cam guide grooves 12g formed in the inner peripheral surface of the inner cavity of the counter gear shaft 12, the pin members 23 fitted in required positions of the counter gear shaft 12 are advanced or retracted so as to swing the swing claw members R, thereby effecting the engagement and disengagement between the swing claw members R and the engaging projected portions 31 of the driven transmission gears (n). Therefore, it is possible with small moving amounts of the cam rods C to advance or retract the required pin members 23, to thereby switch over the engagement, and to perform a shift. In addition, as shown in FIG. 1, a structure can be adopted in which the adjacent ones of the driven transmission gears (n) rotatably borne on the counter gear shaft 12 are proximate to each other, whereby the width of the multi-speed transmission 10 in the axial direction can be made smaller.

The shift drum 67 in the shift drive mechanism 50 for the multi-speed transmission 10 has a configuration in which of the shift guide groove G, the gear speed groove portions Gs determined on a gear speed basis and oriented in the circumferential direction so as not to move the shift pin 58 in the axial direction are each set to be longer than the distance the shift drum 67 travels idly from the moment of stop of driving of the shift motor 80. Therefore, while adopting a simple configuration in which an intermittent drive mechanism is unnecessary, the shift rod can be speedily stably maintained in a desired fixed position in a short time and a gear speed can be set securely and speedily, even if the speed of gear shifting by the shift motor 80 is high.

Since the shift guide groove G in the shift drum 67 is formed in the outer peripheral surface of the shift drum 67 continuously over at least twice the circumference, even the multi-speed transmission 10 having a multiplicity of gear speeds as many as six gear speeds can be coped with by a single shift drum 67 and by a shift drum 67 having a small outside diameter. Thus, it is possible to achieve reductions in size, weight and cost of the multi-speed transmission 10.

Besides, since the turning angle of the shift drum 67 is detected through a speed reduction by a speed reducing gear mechanism including the big-diameter speed reducing gear 75b, the small-diameter speed reducing gear 75s and the like, it is possible to use an inexpensive potentiometer 78.

Figure 28:
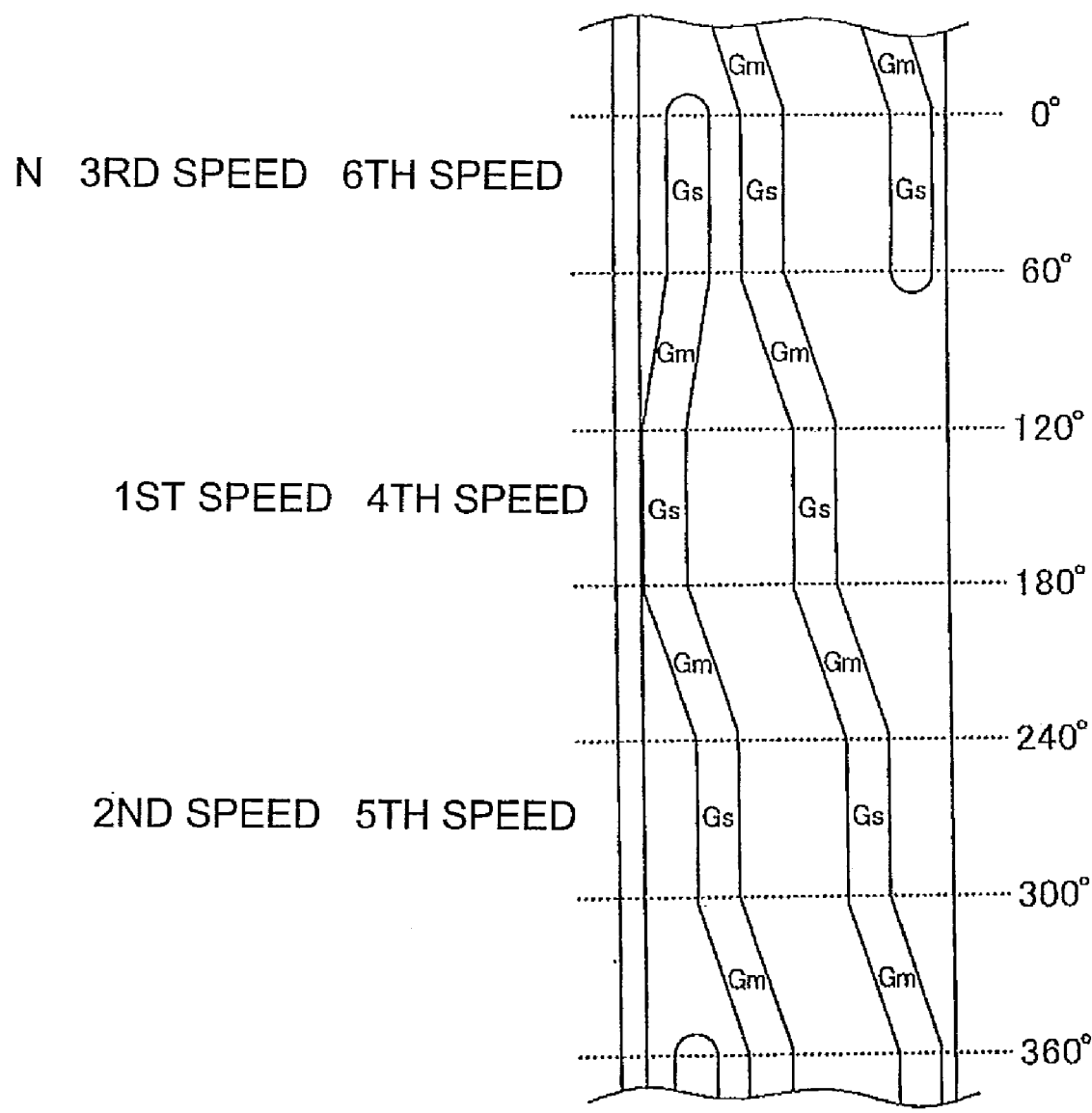
FIG. 28 is a development of an outer peripheral surface of a shift drum.

As shown in FIG. 28, each of the gear speed groove portions Gs has a length, in terms of turning angle of the shift drum 67, of 60 degrees; in other words, each of the gear speed groove portions Gs is set to be longer than the distance the shift drum 67 travels idly from the moment of stop of driving of the shift motor 80.

Each of the gear speed groove portions Gs and each of the shift groove portions Gm both have a length in terms of turning angle of 60 degrees, and a plurality of gear speed groove portions Gs overlap with each other at the same circumferential-direction position in the outer peripheral surface of the shift drum 67.

More specifically, as shown in FIG. 28, the gear speed groove portions for N (neutral), 3rd speed and 6th speed are set at the same circumferential-direction position (0° to 60°), the gear speed groove portions for 1st speed and 4th speed are set at the same circumferential-direction position (120° to 180°), and the gear speed groove portions for 2nd speed and 5th speed are set at the same circumferential-direction position (240° to 300°).

Figure 29:
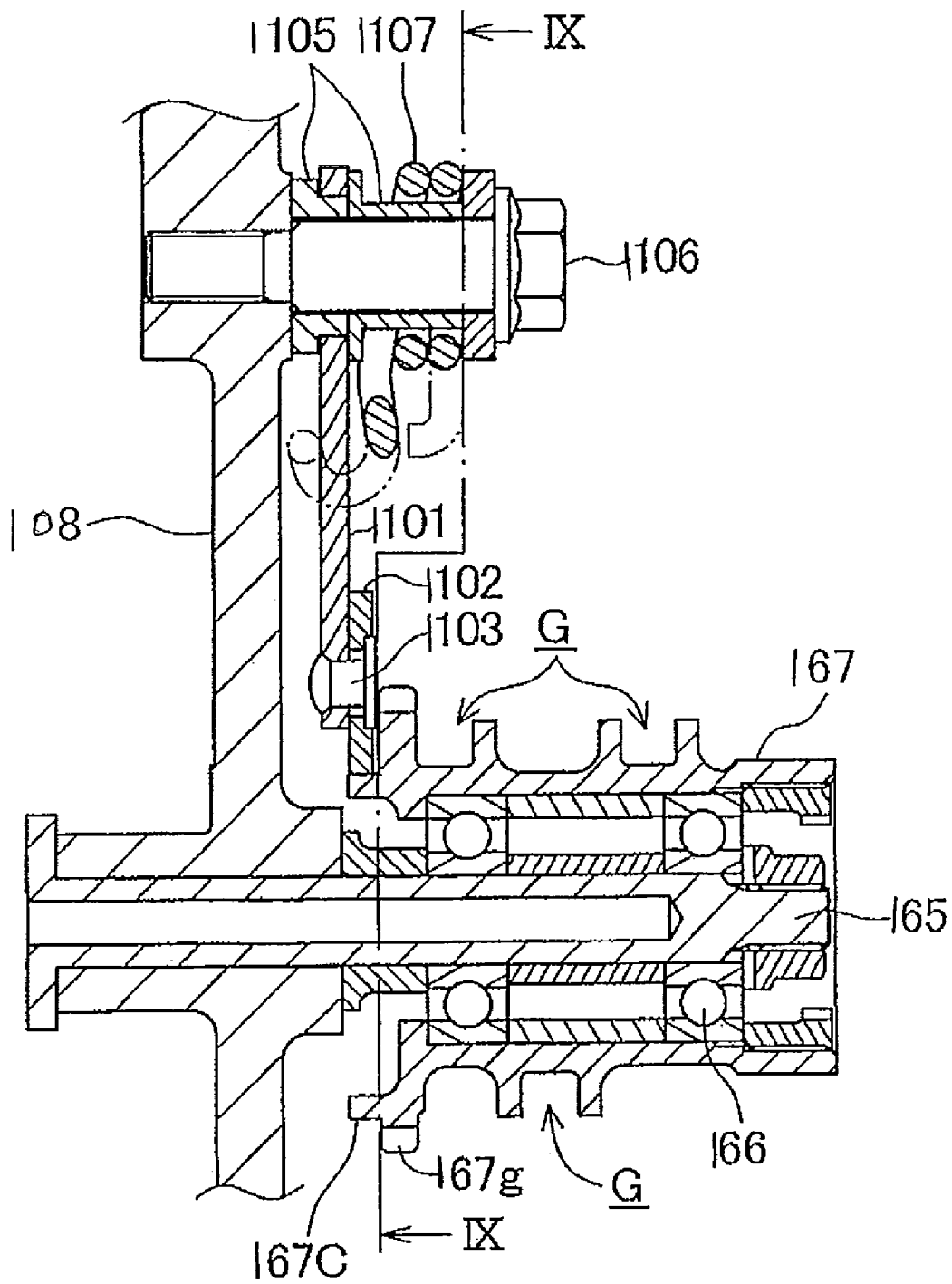
FIG. 29 is a sectional view (a sectional view taken along line VIII-VIII of FIG. 30) of turning restrictive means.
Figure 30:
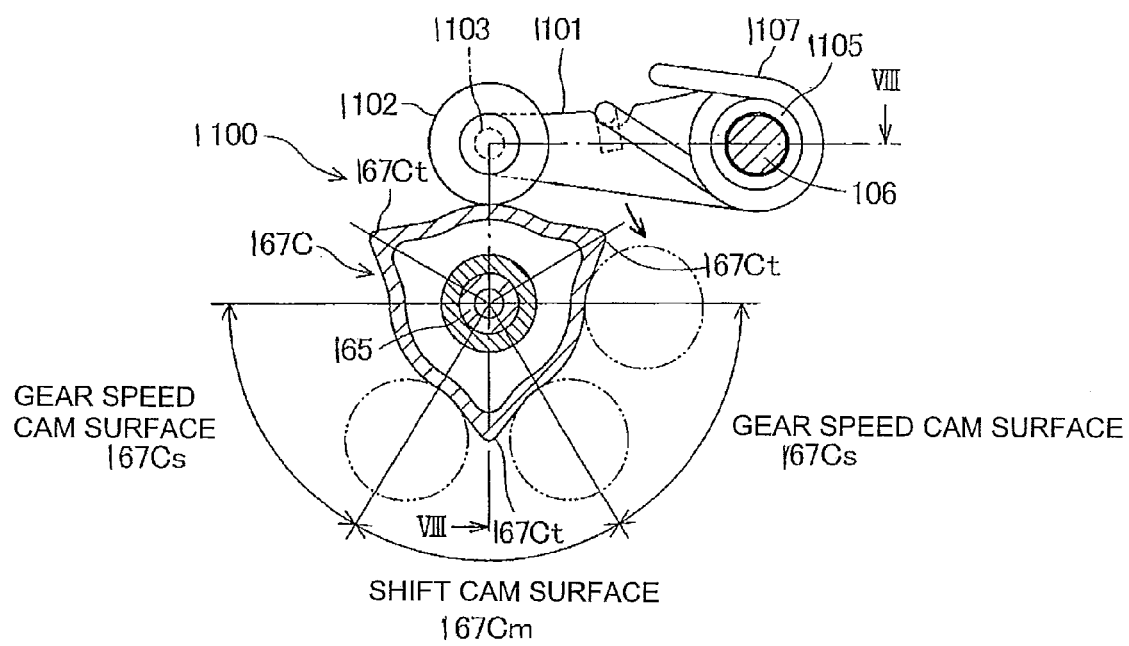
FIG. 30 is a side sectional view (a sectional view taken along line IX-IX of FIG. 29) of the turning restrictive means showing the shape of a turning restrictive shift cam.

In addition, turning restrictive means 1100 for restricting the turning of the shift drum 167 as shown in FIGS. 29 and 30 is provided.

A turning restrictive cam 167C is formed at a side edge portion extends further in the axial direction beyond the drum gear 167g of the shift drum 167.

As shown in FIG. 30, the turning restrictive cam 167C has a deformed triangular shape in side sectional view, and is formed with gear speed cam surfaces 167Cs forming arcuate surfaces having a predetermined outside diameter correspondingly to the gear shift groove portions Gs, and shift cam surfaces 167Cm having acute-angle sharpened high ridges 167Ct at intermediate portions thereof correspondingly to the shift groove portions Gm. The gear speed cam surfaces 167Cs and the shift cam surfaces 167Cm are alternately formed in unit range of 160 degrees.

In the vicinity of the shift drum 167, as shown in FIG. 29, a bolt support shaft 1106 is screw engaged with the bearing cover member 108 while penetrating a cylindrical collar member 1105 and by way of the cylindrical collar member 1105. The bolt support shaft 1106 is projectingly provided in parallel to the center axis of the shift drum 167, and a base end portion of a restrictive arm member 1101 is swingably supported on the cylindrical collar member 1105.

At a tip portion of the restrictive arm member 1101, a roller 1102 is turnably borne on a support shaft 1103.

A torsion spring 1107 wound around the cylindrical collar member 1105 is fixed at its one end to the bearing cover member 108, is locked at its other end to one edge of the restrictive arm member 1101, thereby urging the restrictive arm member 1101 in one swinging direction (counterclockwise in FIG. 30).

As shown in FIG. 30, the restrictive arm member 1101 urged for swinging by the torsion spring 1107 presses the roller 1102, turnably borne on the tip thereof, against a cam surface of the turning restrictive cam 167C of the shift drum 167.

The roller 1102 at the tip of the restrictive arm member 1101 is so set that it presses against the gear speed cam surface 167Cs when the shift pin 158 is in the gear speed groove portion Gs, and it presses against the shift cam surface 167Cm and rides over the intermediate high ridge 167Ct when the shift pin 158 is in the shift groove portion Gm.

As above-mentioned, the shift cam surface 167Cm of the turning restrictive cam 167C is formed with the high cam ridge 167Ct at an intermediate portion thereof, and the gear speed cam surface 167Cs is formed with the arcuate surface having a predetermined outside diameter. Therefore, when the roller 1102 at the tip of the restrictive arm member 1101 urged for swinging by the turning restrictive means 1100 rides over the high cam ridge 167Ct at the time of gear shifting, the gear speed is switched over assuredly, and the roller 1102 comes to stay on the gear speed cam surface 167Cs between the high cam grooves 167Ct and 167Ct. Consequently, the shift drum 167 is securely restricted from turning, and the gear speed is easily maintained without use of a brake.

In addition, the intermediate shaft 170 integrally rotatably supporting the small-diameter intermediate gear 172 in mesh with the drum gear 167g at a side edge of the shift drum 167 extends to the right, and is formed with a small-diameter gear 173 at its end portion.

As illustrated in FIG. 2, a hollow cylindrical base portion 77a of the large-diameter gear 77 is connected to an operating portion of a potentiometer 78 supported on the lower engine case 1L.

Since the potentiometer 78 detects the turning of the shift drum 167 through speed reduction by the speed reducing gear mechanism, the detected angle is about ⅓ times the turning angle of the shift drum 167.

With the turning angle of the shift drum 167 thus detected through speed reduction by the speed reducing gear mechanism, an inexpensive potentiometer 78 can be used.

According to the present shift drive mechanism 50, a configuration is adopted in which a plurality of gear speed groove portions Gs overlap with each other at the same circumferential-direction position in the outer peripheral surface of the shift drum 67, and the turning of the shift drum 67 is restricted at a turning angle corresponding to a required gear speed by the turning restrictive means 100. Therefore, the shift rod 51 can be stably maintained in a desired axial-direction position and the gear speed can be set while using the simple turning restrictive means 100, without a special need for an intermittent drive mechanism, so that a plurality of gear speeds are set with one turning of the shift drum 67 which is restricted from turning by the turning restrictive means 100. Accordingly, it is possible to reduce the shift drum 67 in diameter, to simplify the turning restrictive means 100, to achieve reductions in the size, weight and cost of the multi-speed transmission 10.

The gear speed groove portions Gs of the shift guide groove G are each set to be longer than the distance the shift drum 67 travels idly from the moment of stop of driving of the shift motor 80. Therefore, even if the driving speed of the shift motor 80 is high, the shift rod 51 can be speedily and stably maintained in a desired fixed position and the gear speed can be set assuredly and speedily, while using a simple configuration and without need for an intermittent drive mechanism.

The shift cam surface 67Cm of the turning restrictive cam 67C is formed with the high cam ridge 67Ct at an intermediate portion thereof, and the gear speed cam surface 67Cs is formed with the arcuate surface having a predetermined outside diameter. Therefore, when the roller 102 at the tip of the restrictive arm member 101 urged for swinging by the turning restrictive means 100 rides over the high cam ridge 67Ct at the time of gear shifting, the gear speed is securely switched over, and the roller 102 comes to stay on the gear speed cam surface 67Cs between the high cam ridges 67Ct and 67Ct. Consequently, the shift drum 67 is securely restricted from turning, and the gear speed is easily maintained without use of a brake.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift drive mechanism for a multi-speed transmission comprising:
    a plurality of drive gears supported on a first gear shaft and a plurality of driven gears supported on a second gear shaft which extends parallel to the first gear shaft, the plurality of drive gears being in a state of constant mesh on a gear speed basis, respectively, with the plurality of driven gears fixed to the second gear shaft;
    an engagement switch-over mechanism being provided by which engagement between the second gear shaft and each of the plurality of drive gears on the first gear shaft is switched over on a gear basis, and the engagement switch-over mechanism being driven by a shift drive mechanism so as to perform a shift,
    wherein the shift drive mechanism includes:
    a shift rod inserted on an inner side of a plurality of cam rods along a center axis of an inner cavity of the gear shaft, the shift rod being moved in an axial direction to thereby move the cam rods;
    a shift pin moved in the axial direction together with the shift rod;
    a shift drum having a center axis of rotation parallel to the shift rod, the shift drum having an outer peripheral surface formed with a shift guide groove with which an end portion of the shift pin is engaged; and
    a shift actuator for turning the shift drum;
    wherein the shift guide groove has a configuration in which gear speed groove portions being formed at axial-direction positions determined on the gear speed basis and being oriented in a circumferential direction so as not to move the shift pin in the axial direction attendant on turning of the shift drum are sequentially connected to each other through spirally shaped shift groove portions operable to move the shift pin in the axial direction attendant on turning of the shift drum; and wherein the gear speed groove portions are each set to be longer than a distance the shift drum travels idly from a moment of stop of driving of the shift actuator.

2. The shift drive mechanism for the multi-speed transmission according to claim 1, wherein the shift guide groove is formed continuously over at least one circumference in the outer peripheral surface of the shift drum.

3. The shift drive mechanism for the multi-speed transmission according to claim 2, wherein detection of a turning angle of the shift drum is conducted through speed reduction applied to the turning of the shift drum by a speed reducing gear mechanism.

4. The shift drive mechanism for the multi-speed transmission according to claim 1, wherein the shift rod includes a lost motion mechanism wherein axial movement of the shift rod causes the axial movement of the cam rods through the lost motion mechanism.

5. The shift drive mechanism for the multi-speed transmission according to claim 4, wherein the shift rod is a substantially cylindrical rod-like shape with a left side and a right side, said left end including an outer peripheral recess, said right side including an outer peripheral recess, wherein a left side spring and a left side spring holder are mounted relative to a left lost motion mechanism mounted adjacent to the left side of the shift rod and a right side spring and a right side spring holder are mounted relative to a right lost motion mechanism mounted to the right side of the shift rod, said left and right lost motion mechanisms facilitating the axial movement of the cam rods.

6. The shift drive mechanism for the multi-speed transmission according to claim 5, wherein the plurality of cam rods includes a plurality of odd-ordinal speed cam rods including cam grooves in three positions for corresponding to odd-ordinal speed gears, normal-rotation odd-ordinal cam rods each include a corresponding lock claw on an inner peripheral side surface thereof for locking with the right side spring holder whereas reverse-rotation odd-ordinal cam rods include a corresponding lock claw on an inner peripheral side surface thereof for locking with the left side spring holder.

7. The shift drive mechanism for the multi-speed transmission according to claim 5, wherein the plurality of cam rods includes a plurality of even-ordinal speed cam rods including cam grooves in three positions for corresponding to even-ordinal speed gears, normal-rotation even-ordinal cam rods each include a corresponding lock claw on an inner peripheral side surface thereof for locking with the left side spring holder whereas reverse-rotation even-ordinal cam rods include a corresponding lock claw on an inner peripheral side surface thereof for locking the right side spring holder.

8. The shift drive mechanism for the multi-speed transmission according to claim 1, wherein the shift pin includes a first end with a small diameter cylindrical portion for operatively being mounted relative to the shift rod and a second end with a larger diameter cylindrical portion relative to the first end for operatively being in engagement with the shift drum.

9. The shift drive mechanism for the multi-speed transmission according to claim 1, and further including a support shaft received in a shaft hole of a bearing cover member, said shift drum being turnably mounted on the support shaft through a bearing.

10. The shift drive mechanism for the multi-speed transmission according to claim 9, and further including an intermediate shaft turnably mounted in a bearing hole in the bearing cover member through a bearing, a gear on the intermediate shaft operatively in mesh with a gear on the shift drum for imparting a turning motion to the shift drum.

11. A shift drive mechanism for a multi-speed transmission comprising:

a plurality of drive gears supported on a main shaft and a plurality of driven gears supported on a counter shaft which extends parallel to the main shaft, the plurality of drive gears being in a state of constant mesh on a gear speed basis, respectively, with the plurality of driven gears fixed to the counter gear shaft;

an engagement switch-over mechanism being provided by which engagement between the counter gear shaft and each of the plurality of drive gears on the main shaft is switched over on a gear basis, and the engagement switch-over mechanism being driven by a shift drive mechanism so as to perform a shift;

wherein the shift drive mechanism includes:

a shift rod inserted on an inner side of a plurality of cam rods along a center axis of an inner cavity of the gear shaft, the shift rod being moved in an axial direction to thereby move the cam rods;

a shift pin moved in the axial direction together with the shift rod;

a shift drum having a center axis of rotation parallel to the shift rod, the shift drum having an outer peripheral surface formed with a shift guide groove with which an end portion of the shift pin is engaged; and a shift actuator for turning the shift drum;

the shift guide groove has a configuration in which gear speed groove portions being formed at axial-direction positions determined on the gear speed basis and being oriented in the circumferential direction so as not to move the shift pin in the axial direction attendant on turning of the shift drum are sequentially connected to each other through spirally shaped shift groove portions operable to move the shift pin in the axial direction attendant on turning of the shift drum, so that the shift guide groove is continuously formed spirally in the outer peripheral surface of the shift drum over at least one circumference;

a plurality of the gear speed groove portions overlap with each other at the same circumferential-direction position in the outer peripheral surface of the shift drum; and turning of the shift drum is restricted at a turning angle corresponding to each gear speed by turning restrictive means having a restrictive member pressed against a cam surface of a turning restrictive cam mounted to the shift drum so as to be turnable as one body with the shift drum.

12. The shift drive mechanism for the multi-speed transmission, according to claim 11, wherein the gear speed groove portion is set to be longer than a distance the shift drum travels idly from a moment of stop of driving of the shift actuator.

13. The shift drive mechanism for the multi-speed transmission, according to claim 12, wherein the turning restrictive cam comprises a shift cam surface pressed by the restrictive member when the shift pin is in the shift groove portion, and a gear speed cam surface pressed by the restrictive member when the shift pin is in the gear speed groove portion;

the shift cam surface is formed with a high cam ridge at an intermediate portion thereof; and the gear speed cam surface is formed by an arcuate surface having a predetermined outside diameter.

14. The shift drive mechanism for the multi-speed transmission according to claim 11, wherein the shift rod includes a lost motion mechanism wherein axial movement of the shift rod causes the axial movement of the cam rods through the lost motion mechanism.

15. The shift drive mechanism for the multi-speed transmission according to claim 14, wherein the shift rod is a substantially cylindrical rod-like shape with a left side and a right side, said left end including an outer peripheral recess, said right side including an outer peripheral recess, wherein a left side spring and a left side spring holder are mounted relative to a left lost motion mechanism mounted adjacent to the left side of the shift rod and a right side spring and a right side spring holder are mounted relative to a right lost motion mechanism mounted to the right side of the shift rod, said left and right lost motion mechanisms facilitating the axial movement of the cam rods.

16. The shift drive mechanism for the multi-speed transmission according to claim 15, wherein the plurality of cam rods includes a plurality of odd-ordinal speed cam rods including cam grooves in three positions for corresponding to odd-ordinal speed gears, normal-rotation odd-ordinal cam rods each include a corresponding lock claw on an inner peripheral side surface thereof for locking with the right side spring holder whereas reverse-rotation odd-ordinal cam rods include a corresponding lock claw on an inner peripheral side surface thereof for locking with the left side spring holder.

17. The shift drive mechanism for the multi-speed transmission according to claim 15, wherein the plurality of cam rods includes a plurality of even-ordinal speed cam rods including cam grooves in three positions for corresponding to even-ordinal speed gears, normal-rotation even-ordinal cam rods each include a corresponding lock claw on an inner peripheral side surface thereof for locking with the left side spring holder whereas reverse-rotation even-ordinal cam rods include a corresponding lock claw on an inner peripheral side surface thereof for locking the right side spring holder.

18. The shift drive mechanism for the multi-speed transmission according to claim 11, wherein the shift pin includes a first end with a small diameter cylindrical portion for operatively being mounted relative to the shift rod and a second end with a larger diameter cylindrical portion relative to the first end for operatively being in engagement with the shift drum.

19. The shift drive mechanism for the multi-speed transmission according to claim 11, and further including a support shaft received in a shaft hole of a bearing cover member, said shift drum being turnably mounted on the support shaft through a bearing.

20. The shift drive mechanism for the multi-speed transmission according to claim 19, and further including an intermediate shaft turnably mounted in a bearing hole in the bearing cover member through a bearing, a gear on the intermediate shaft operatively in mesh with a gear on the shift drum for imparting a turning motion to the shift drum.

* * * * *